United States Patent [19]
Anderson

[11] Patent Number: 5,235,857
[45] Date of Patent: Aug. 17, 1993

[54] REAL TIME 3D IMAGING DEVICE USING FILTERED ELLIPSOIDAL BACKPROJECTION WITH EXTENDED TRANSMITTERS

[76] Inventor: Forrest Anderson, P.O. Box 1400, Bernalillo, N. Mex. 87004

[21] Appl. No.: 908,951

[22] Filed: Jul. 6, 1992

Related U.S. Application Data

[63] Continuation-in-part of Ser. No. 595,609, Oct. 12, 1990, abandoned, which is a continuation-in-part of Ser. No. 387,615, Jul. 28, 1989, Pat. No. 5,090,245, which is a continuation-in-part of Ser. No. 287,590, Dec. 15, 1988, abandoned, which is a continuation-in-part of Ser. No. 205,298, Jun. 10, 1988, abandoned, which is a continuation-in-part of Ser. No. 106,577, Oct. 7, 1987, Pat. No. 5,134,884, which is a continuation-in-part of Ser. No. 858,696, May 2, 1986, Pat. No. 4,706,499, Ser. No. 908,951, May 2, 1986, Continuation-in-part of Ser. No 480,324, Feb. 12, 1990, Pat. No. 5,005,418, which is a continuation-in-part of Ser. No. 221,534, Jul. 19, 1988, abandoned, which is a continuation-in-part of Ser. No. 106,577, Oct. 7, 1987, Pat. No. 5,134,884, which is a continuation-in-part of Ser. No. 858,696, May 2, 1986, Pat. No. 4,706,499, Ser. No. 908,951, May 2, 1986, Continuation-in-part of Ser. No. 270,636, Nov. 7, 1988, Pat. No. 5,027,655, which is a continuation-in-part of Ser. No. 221,501, Jul. 19, 1988, abandoned, which is a continuation-in-part of Ser. No. 106,577, Oct. 7, 1987, which is a continuation-in-part of Ser. No. 858,696, May 2, 1986, Pat. No. 4,706,499.

[51] Int. Cl.$^5$ .............................. G01N 29/04
[52] U.S. Cl. ........................... 73/625; 73/626
[58] Field of Search ............... 73/597, 602, 606, 625, 73/626, 628; 128/660.07, 660.01, 661.01

[56] References Cited

U.S. PATENT DOCUMENTS

| Re. 30,397 | 9/1980 | King | 128/660 |
|---|---|---|---|
| 3,676,584 | 7/1972 | Plakas | 73/628 |
| 3,717,843 | 2/1973 | Farrah et al. | 73/603 |
| 3,918,025 | 11/1975 | Koskikawa et al. | |
| 4,131,022 | 12/1978 | Mezerich | 73/606 |
| 4,332,016 | 5/1982 | Berntsen | 73/628 |
| 4,395,909 | 8/1983 | Steinberg et al. | 73/606 |
| 4,817,434 | 4/1989 | Anderson | 73/626 |
| 5,027,658 | 7/1991 | Anderson | 73/626 |
| 5,090,245 | 2/1992 | Anderson | 73/626 |

OTHER PUBLICATIONS

Muller et al., 1986 "Reconstruction by the Synthetic Aperture Focussing Technique" Nuclear Eng. and Design 94 (1986) pp. 393–404.

Ozaki, 1988, "A New System for Real Time Synthetic Aperture Ultrasonic Imaging" IEEE Trans. on Ultrasonics, . . . vol. 35, No. 6, 1988.

Rockwell, Apr. 1971, "Migration Stack Aids Interpretation" The Oil & Gas Journal pp. 202–218.

Schneider, Dec. 1971 "Developments in Seismic Data Processing and Analysis" Geophysics vol. 36, Dec. 1971.

French, Jun. 1974, "Computer Migration of Oblique Seismic Reflection Profiles" Geophysics vol. 40, No. 6, Dec. 1975.

Tarantola, 1984, "Linearized Inversion of Seismic Reflection Data" Geophysical Prospecting 32 vol. 2 (1984).

Wiggins, "Kirchoff Integral Extrapolation and Migration of Non Planar Data" Geophysics vol. 49, No. 8, Aug. (1984).

Tarantola, "Inversion of Seismic Reflection Data in the Acoustic Approximation" Geophysics vol. 49, No. 8, Aug. (1984).

S. Bennett et al "A Real Time Synthetic Aperture Digital Imaging System", Acoustical Imaging, vol. 10, 1982.

K. Liang et al "A Three Dimensional Synthetic Focus System" Acoustical Imaging, vol. 10, 1982.

Anderson, F. "Three Dimensional Single Pulse Imaging Using Ellipsoidal Backprojection", May 1989, Albuquerque N.M.

Ozbek, A., Levy, R., "Inversion of Generalized Parabolic Projections", Proc. 21st Ann. Conf. on Inform. and Science Syst., Mar. 1987.

*Primary Examiner*—Louis Arana

[57] ABSTRACT

A real time 3D medical ultrasound imaging machine is disclosed. Large extended transmitters are used with a great range of different pulse types, giving improved signal to noise ratio. Image reconstruction is done by filtered ellipsoidal backprojection. The filter is an inverse triplet filter. Sparse arrays may be used. The imaging machine additionally promises higher resolution, greater sensitivity 2D real time images displayed simultaneously with the real time 3D image.

18 Claims, 31 Drawing Sheets

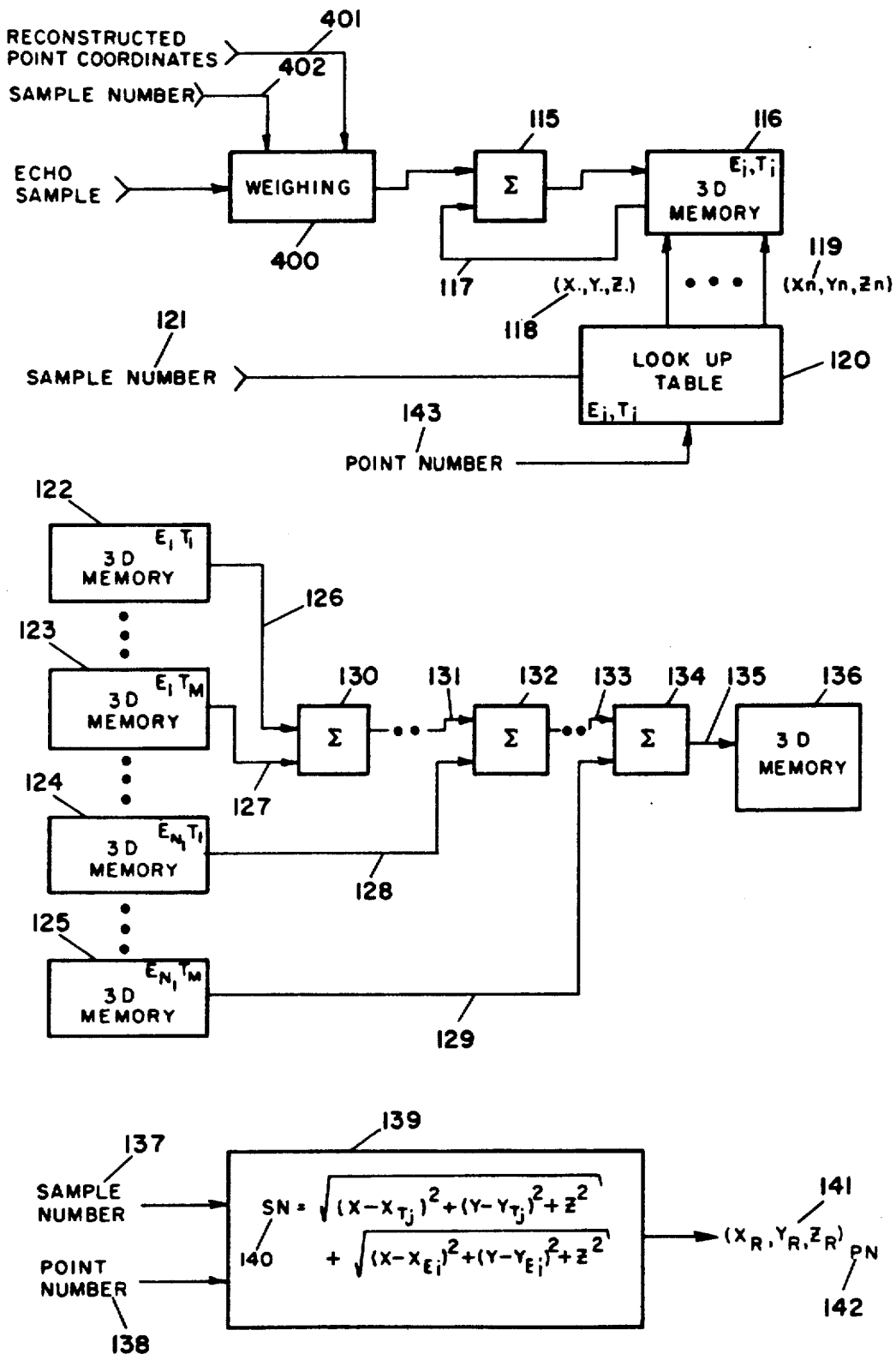
FIG—7

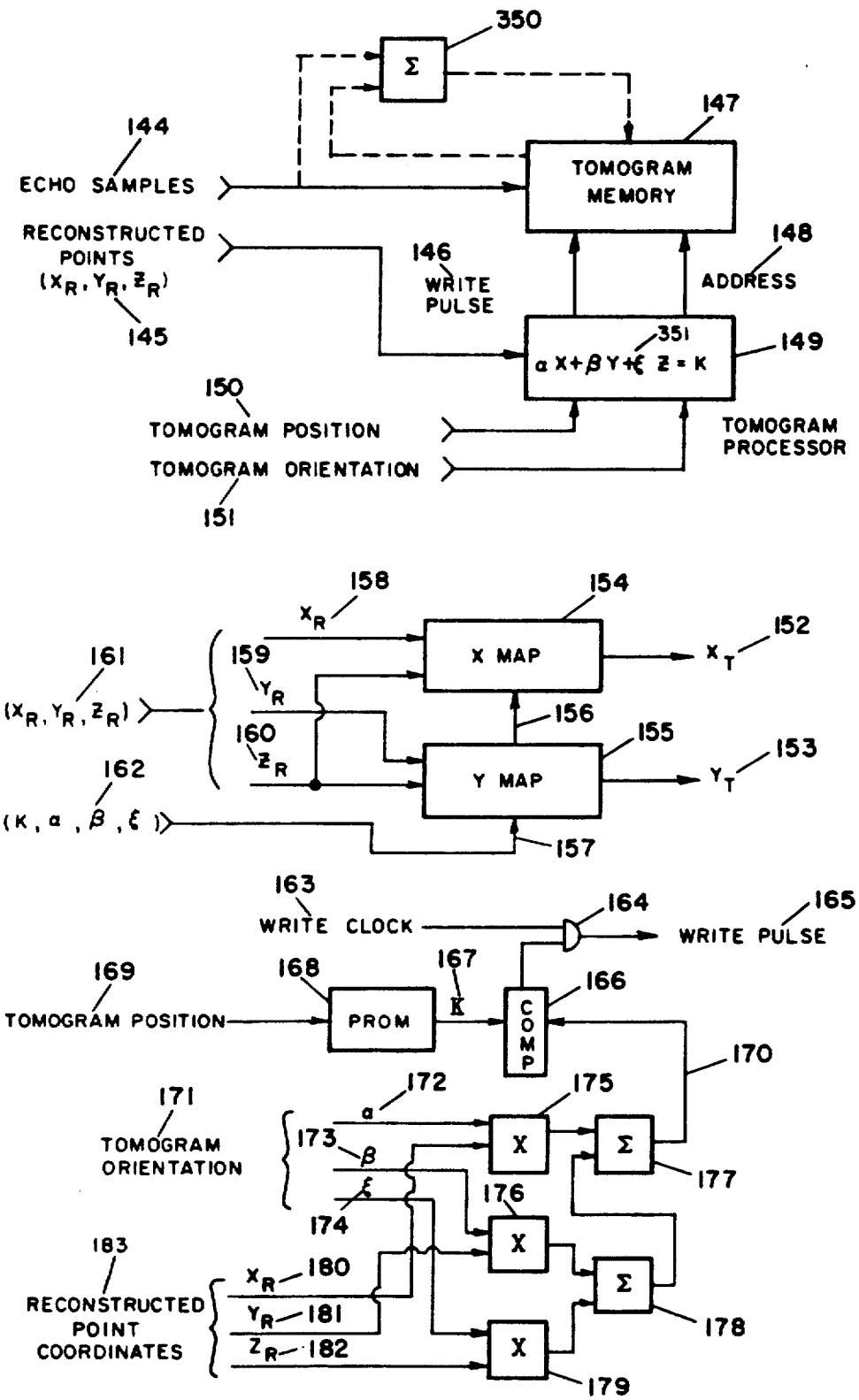
FIG—8

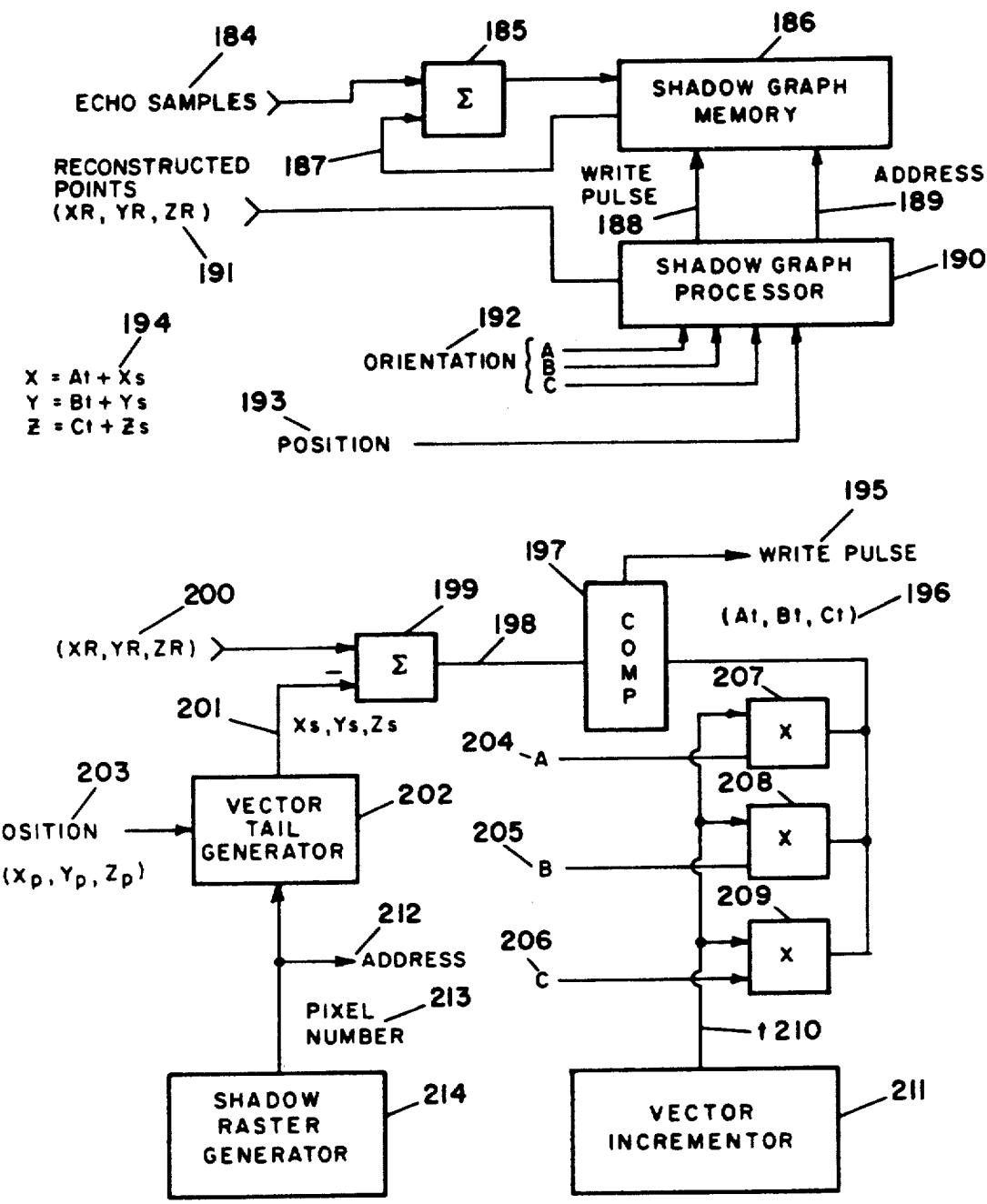
FIG—9

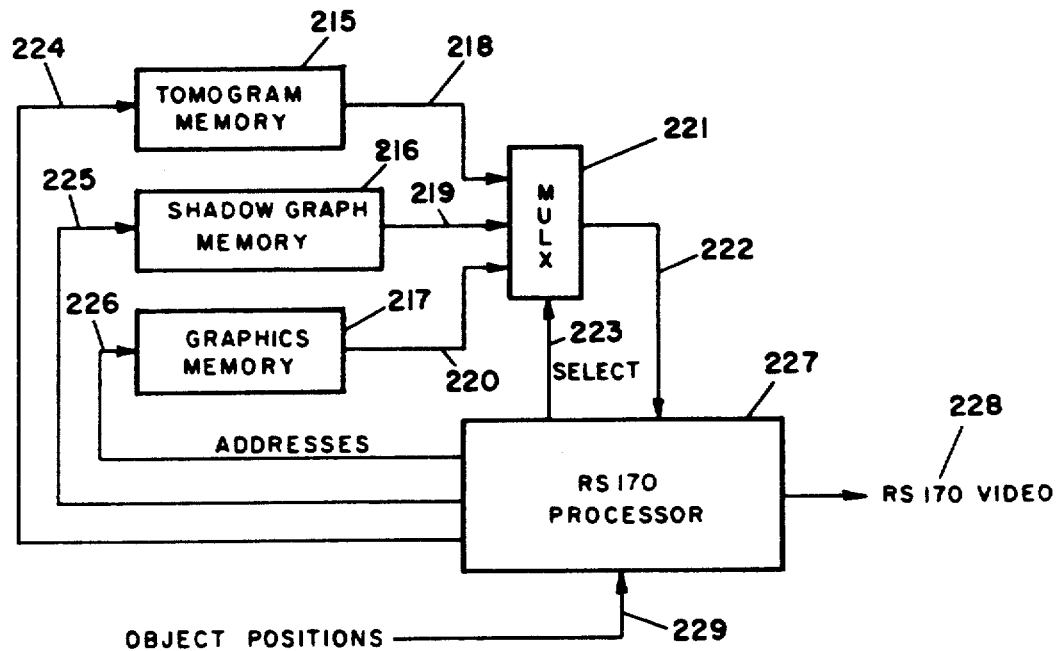
FIG—10
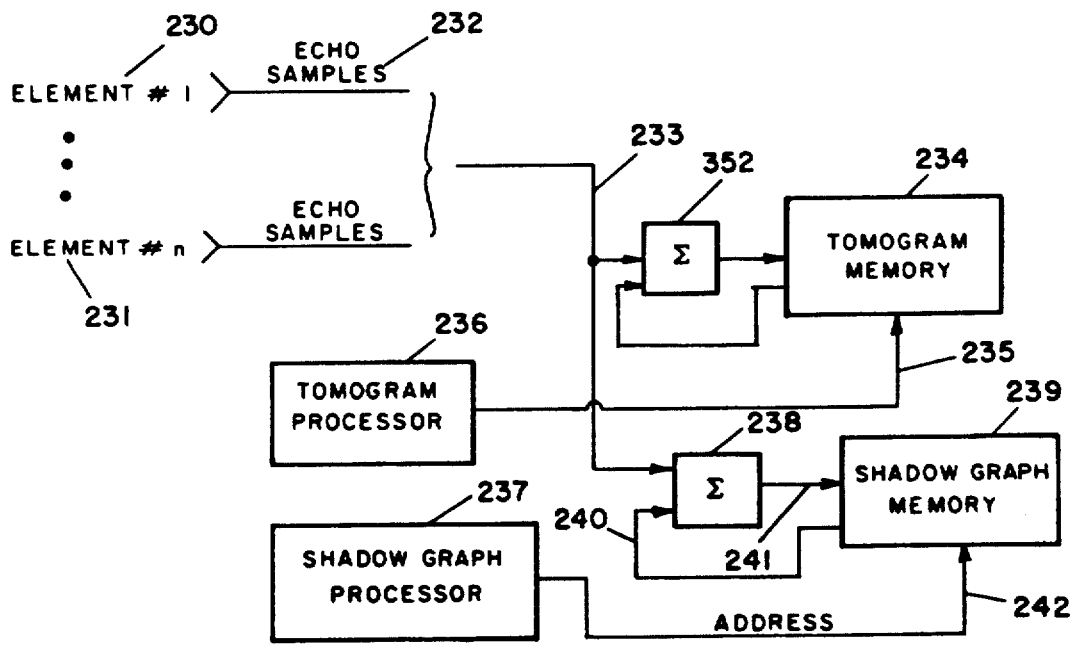
FIG—11

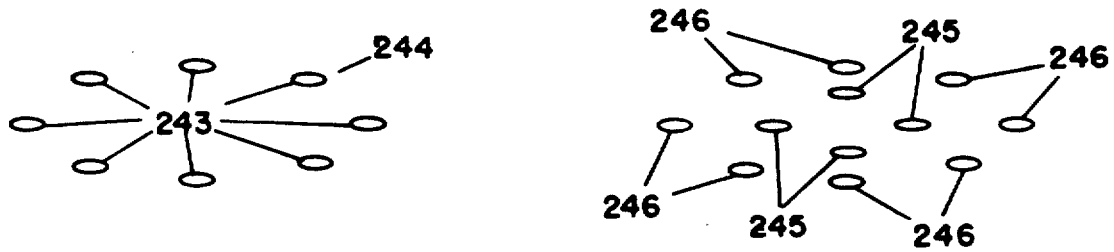
FIG—12
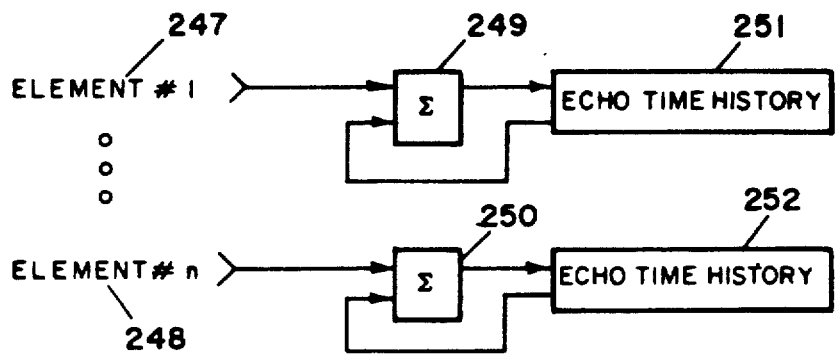
FIG—13
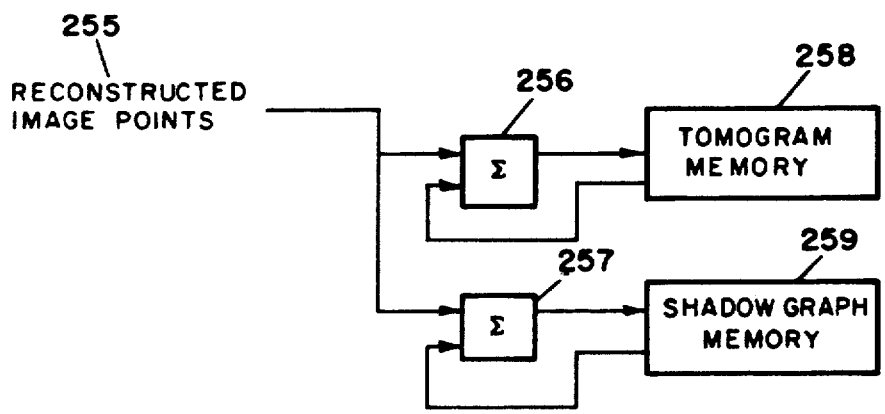
FIG—14

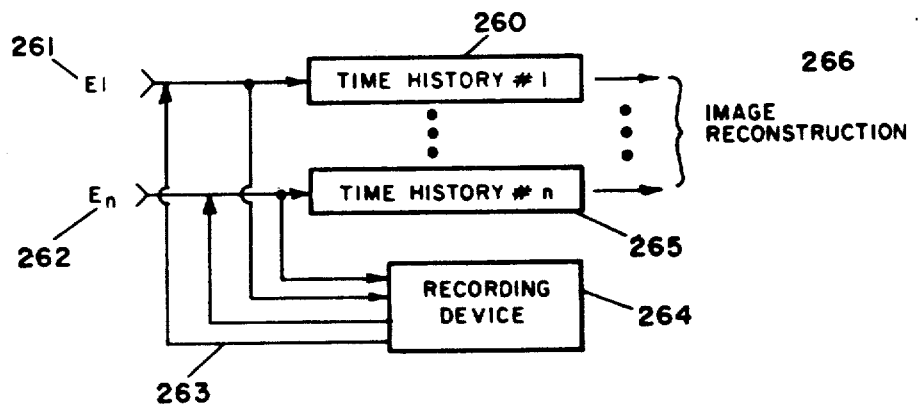
FIG—15
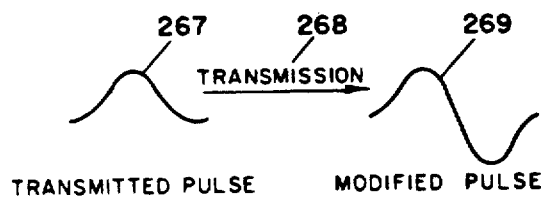
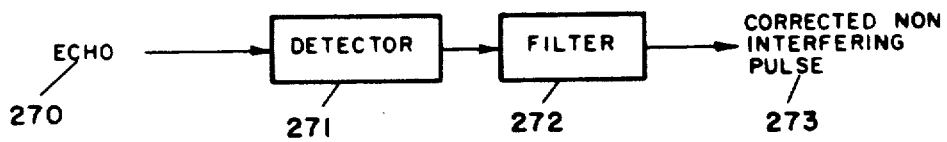
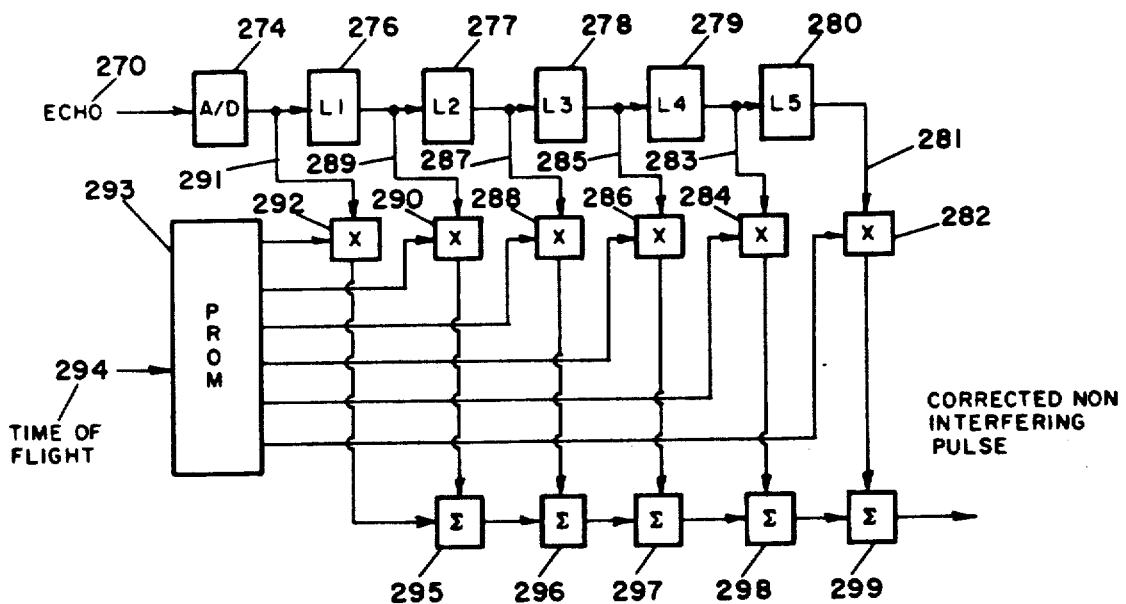
FIG—16

FIG — 25

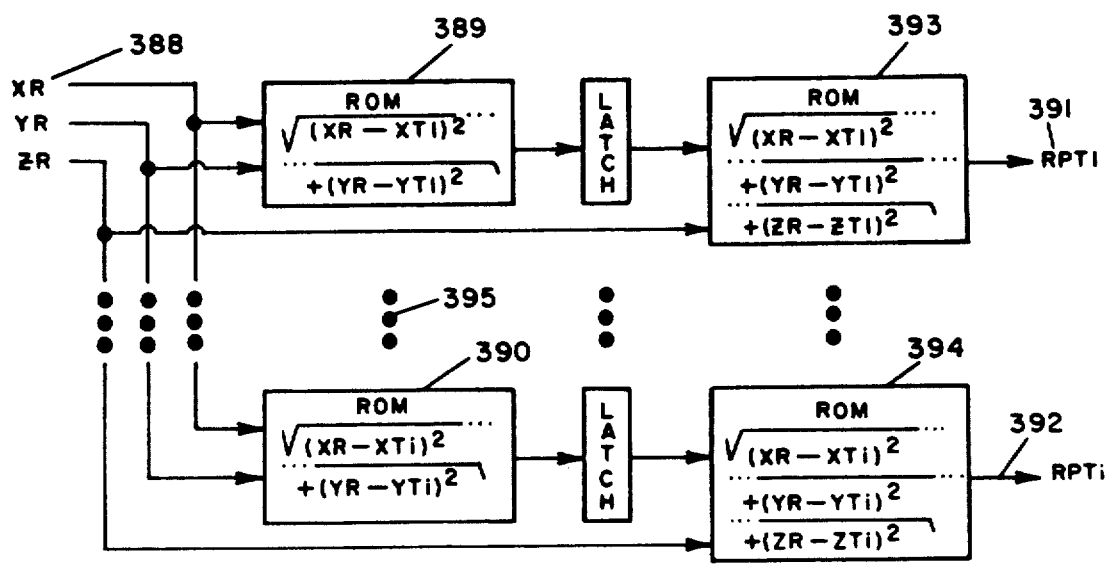
FIG — 28
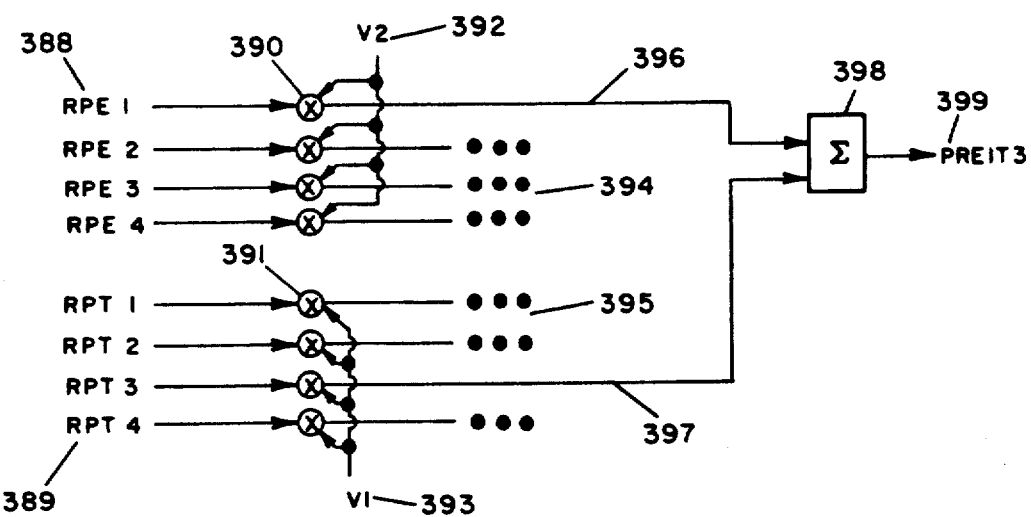
FIG — 29

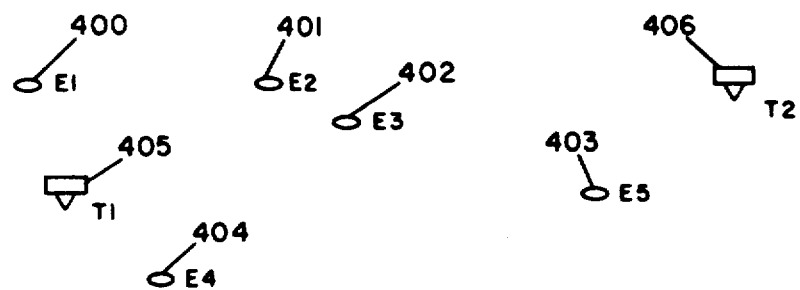
FIG — 30
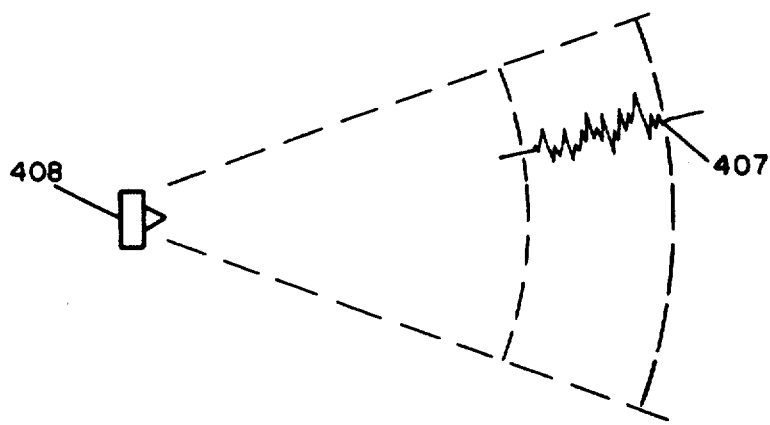
FIG — 31
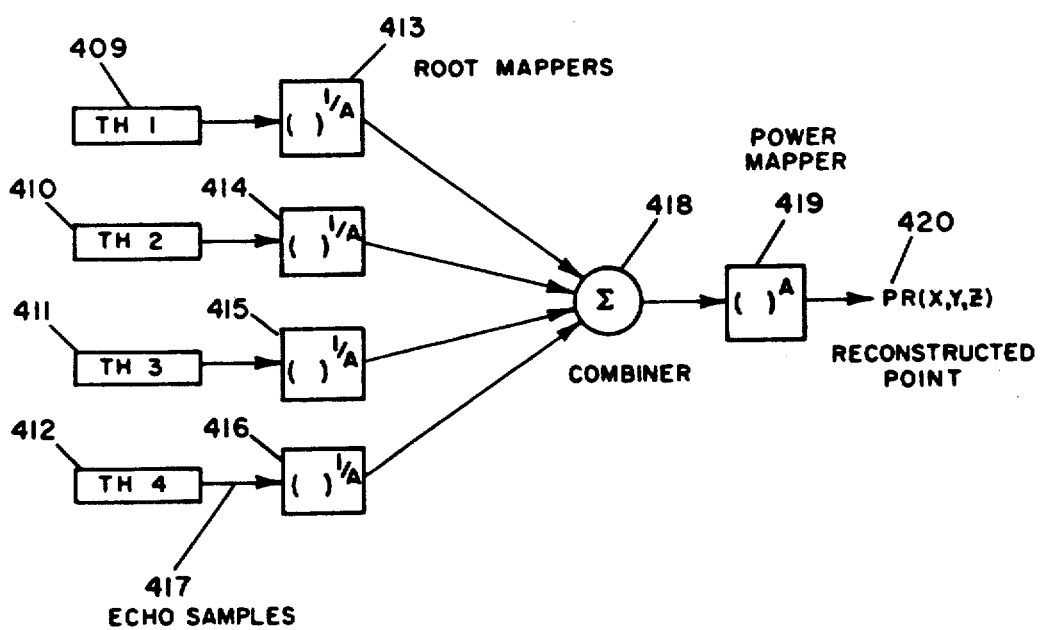
FIG — 32

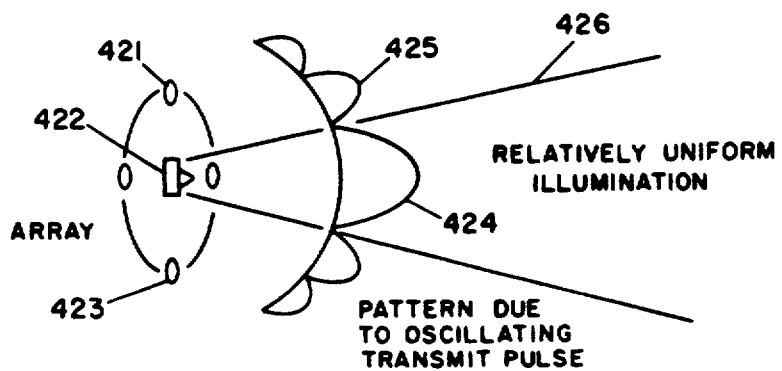
FIG—33
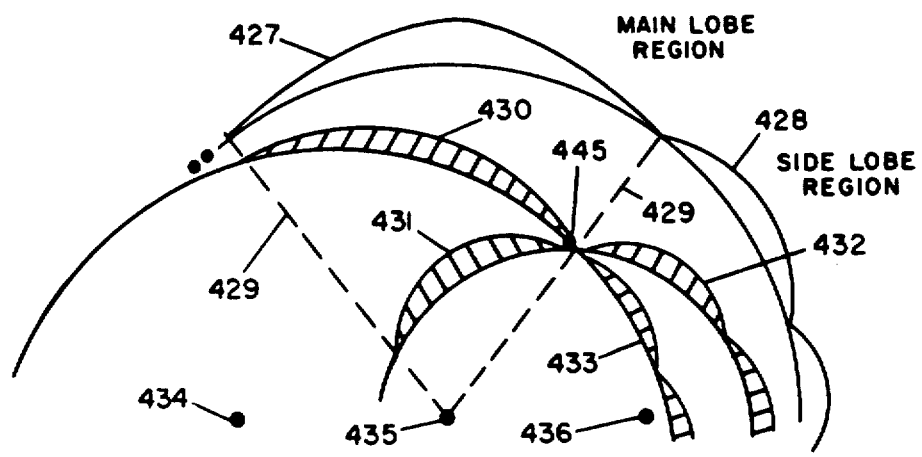
FIG—34
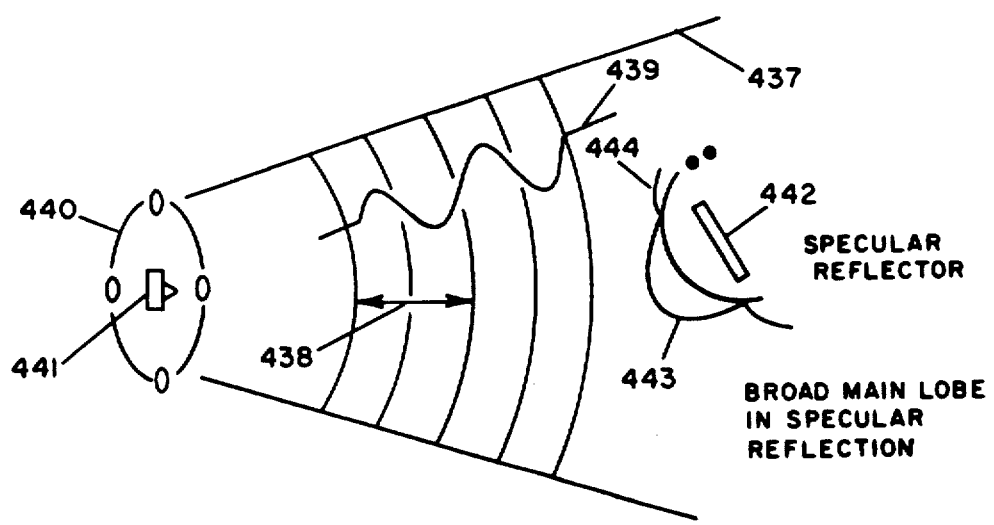
FIG—35

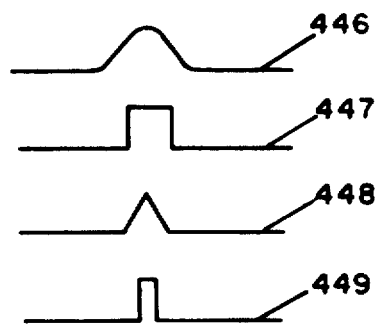
FIG — 36
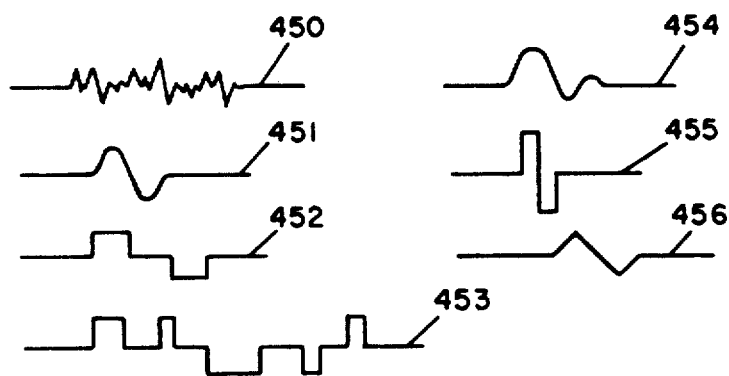
FIG — 37
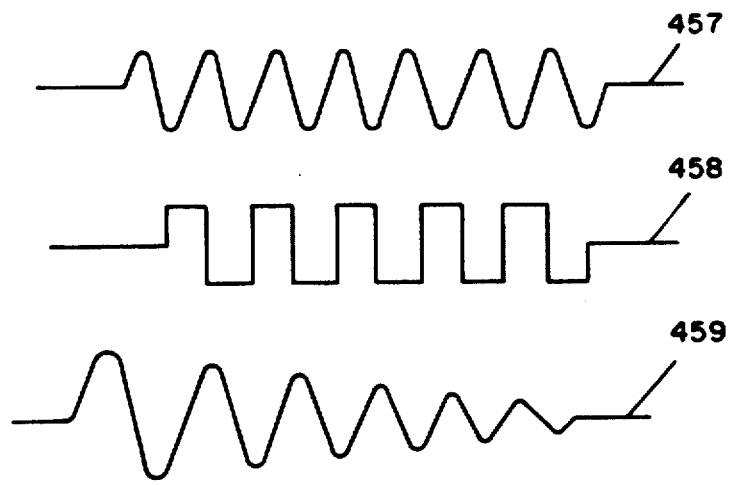
FIG — 38

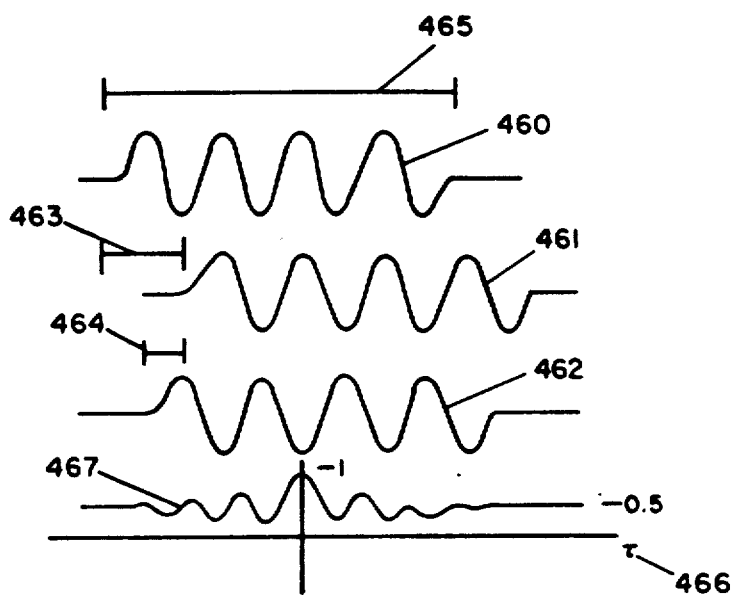
FIG — 39
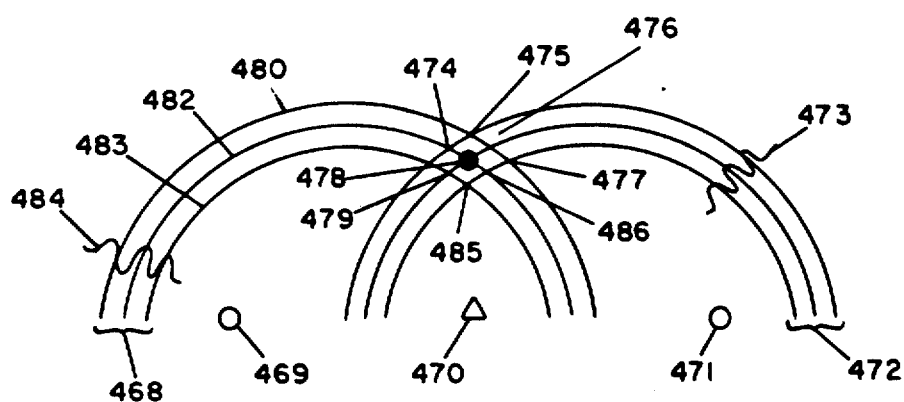
FIG — 40
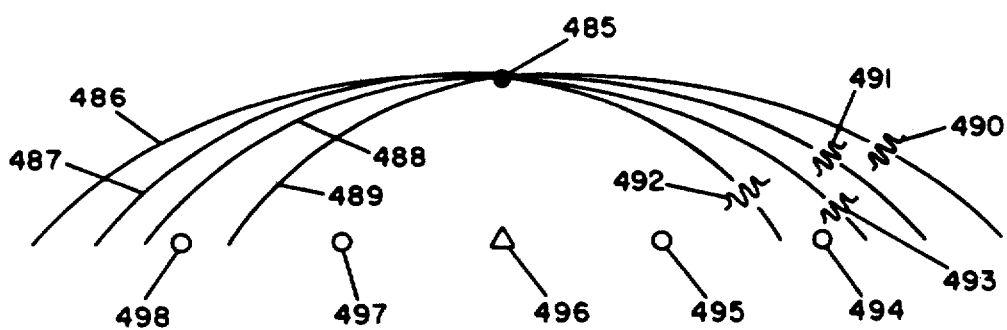
FIG — 41

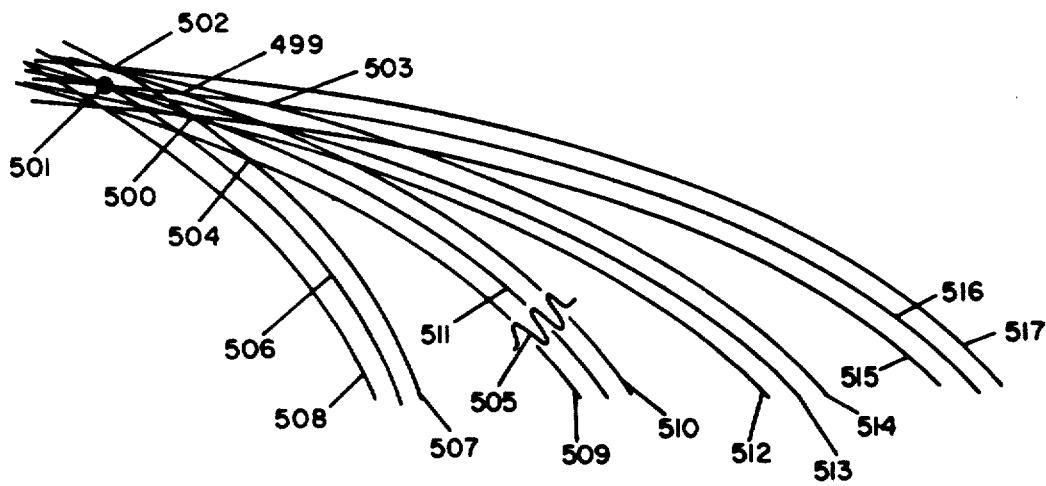
FIG — 42
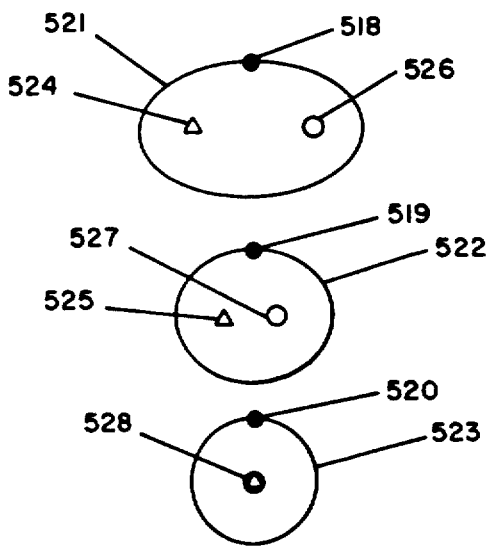
FIG — 43
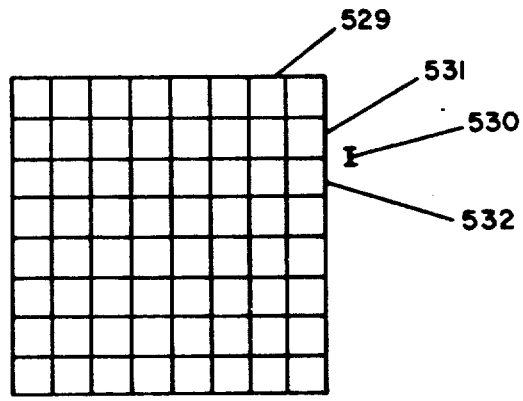
FIG — 44

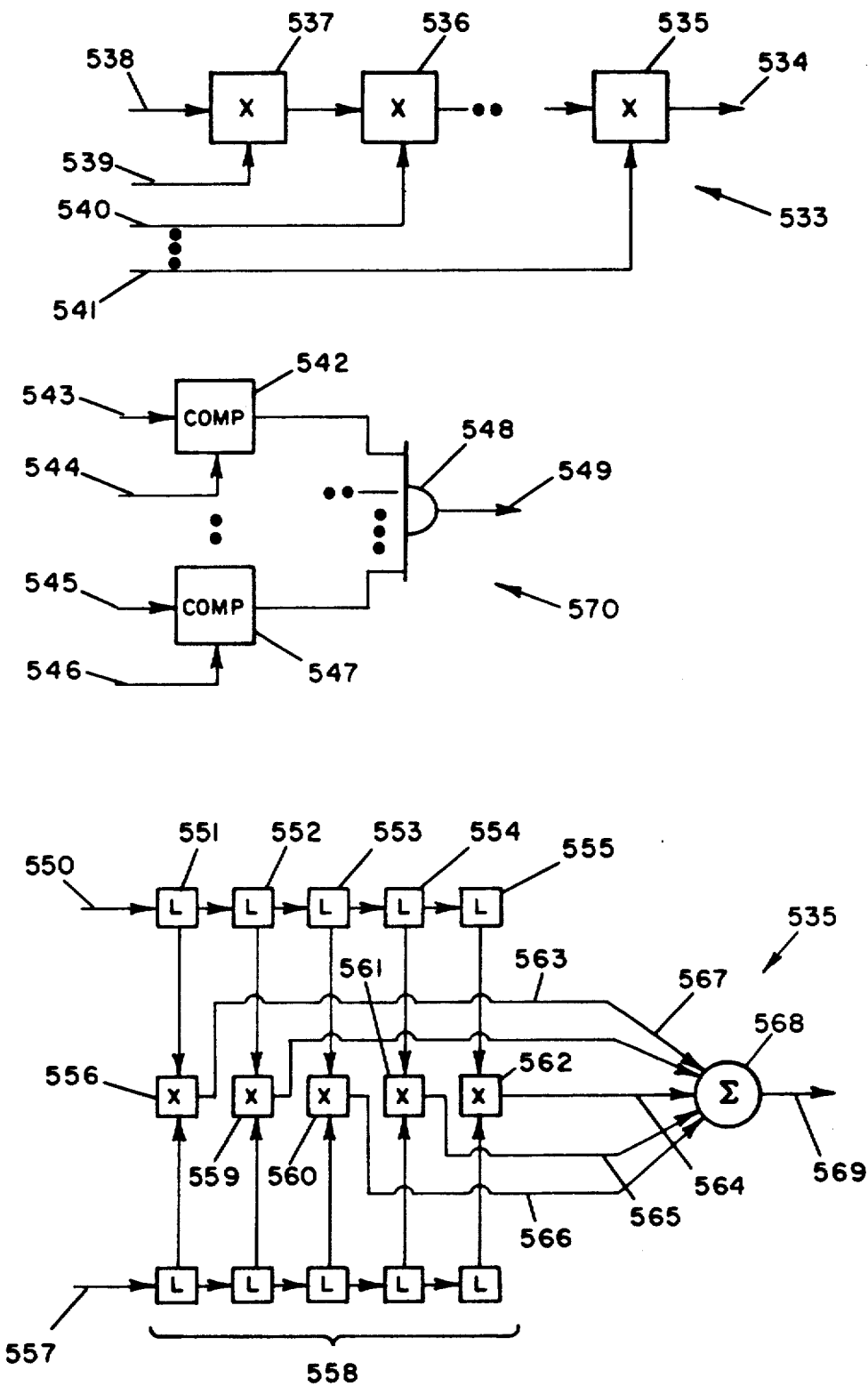
FIG — 45

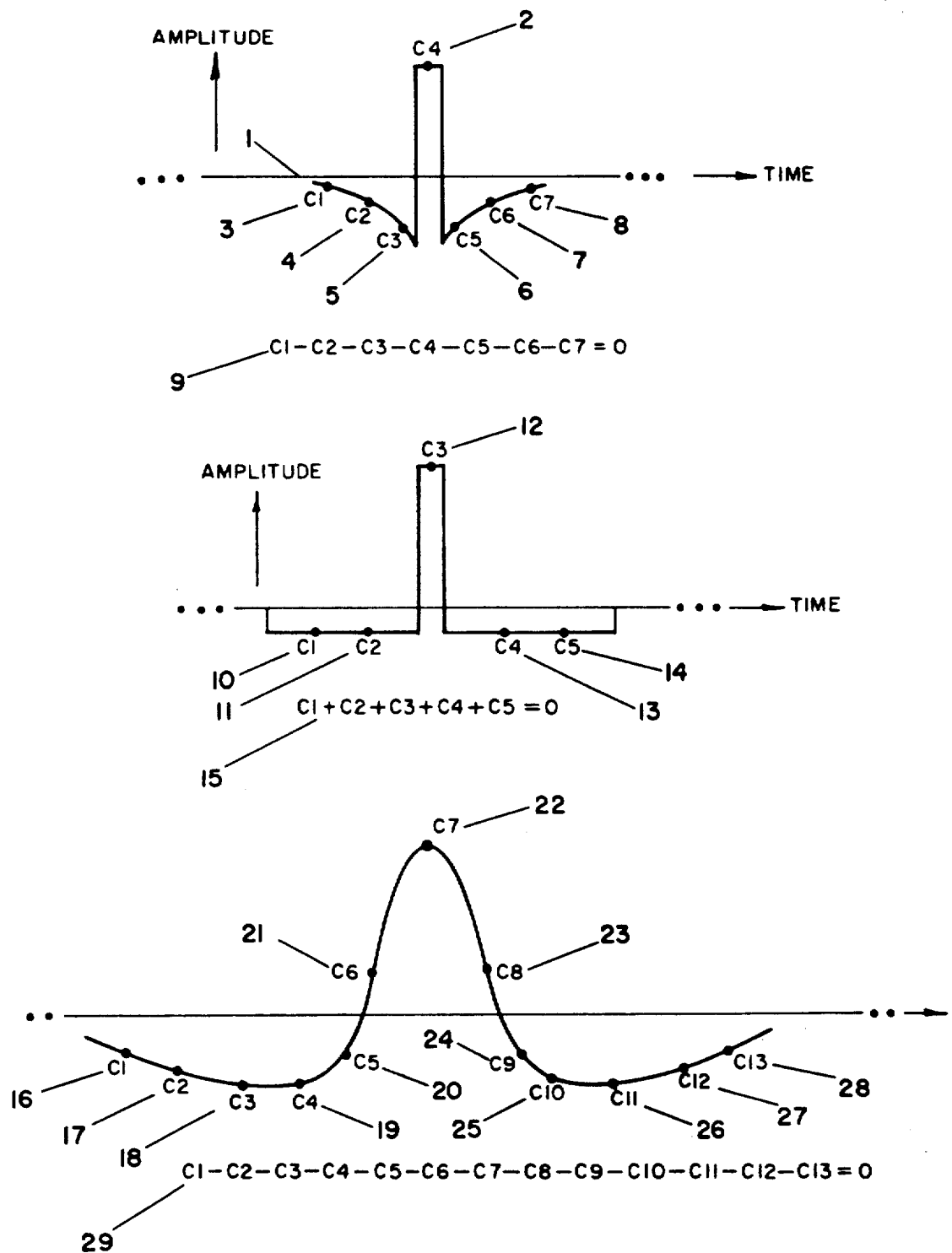
FIG—46

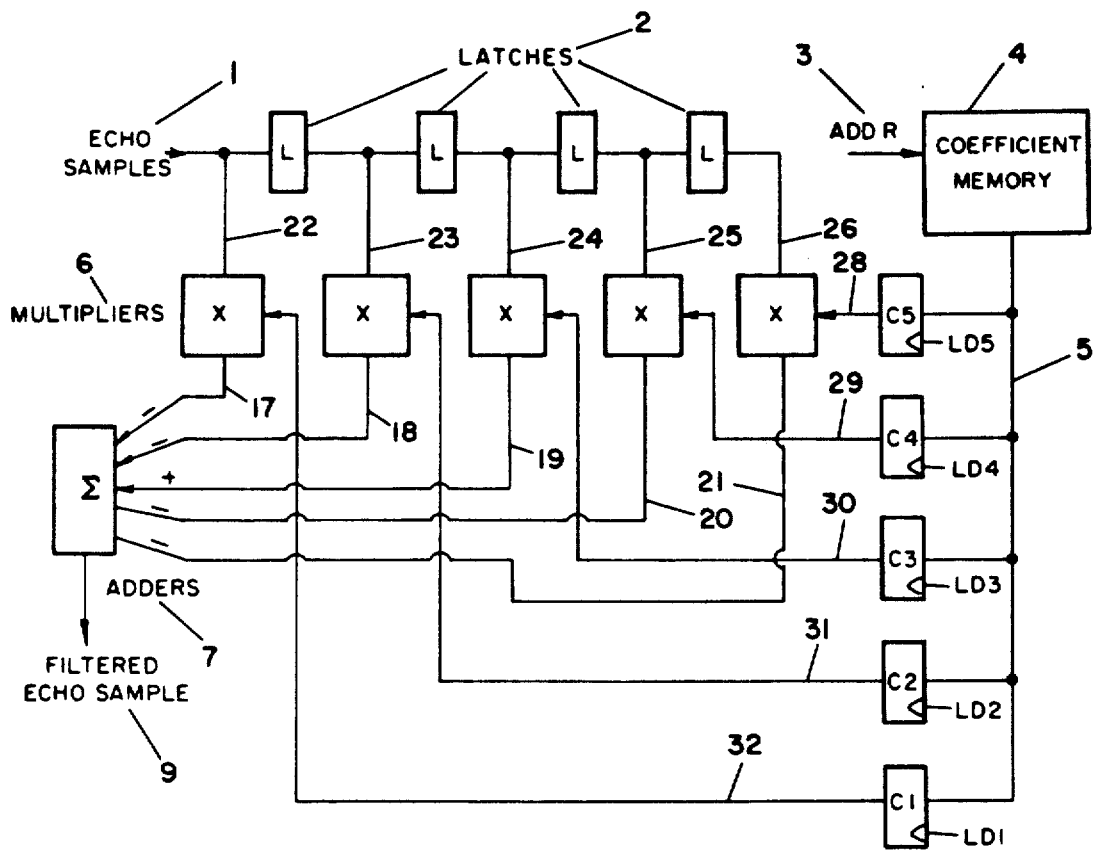
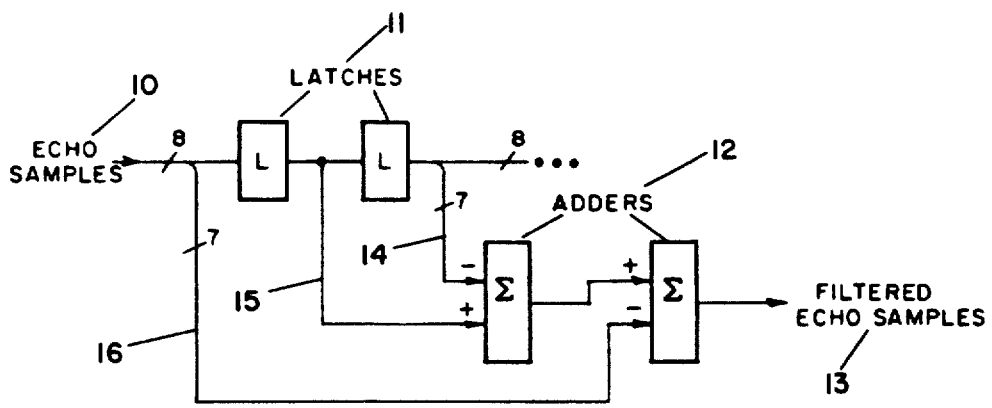
FIG — 47

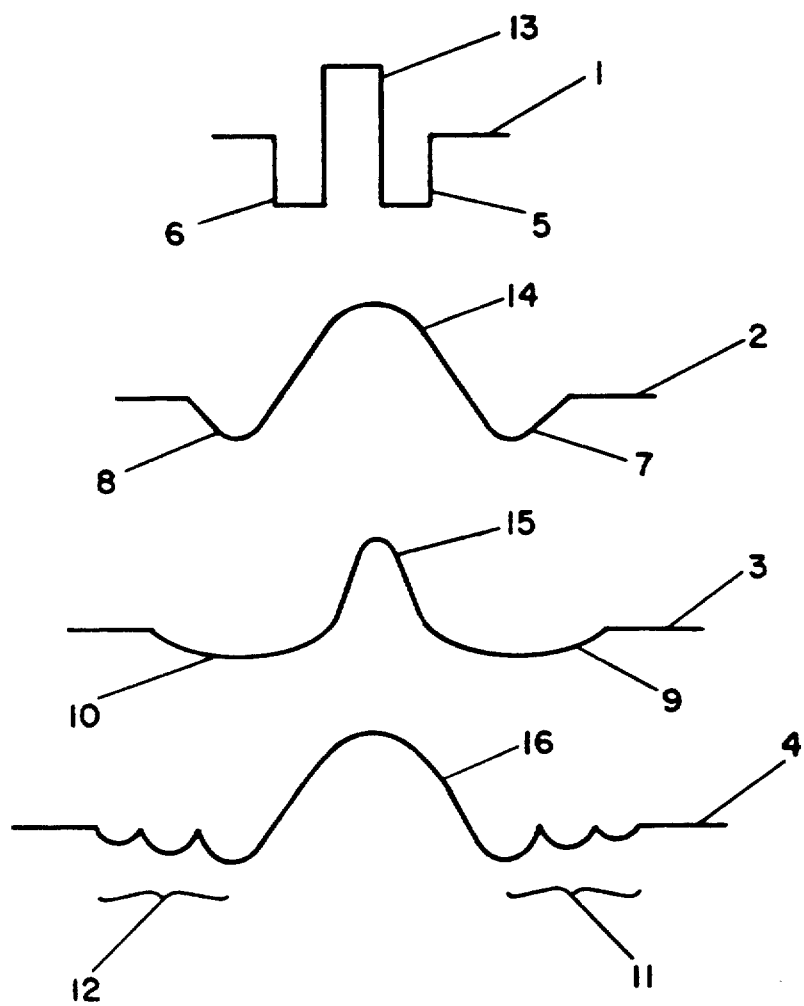
FIG — 48
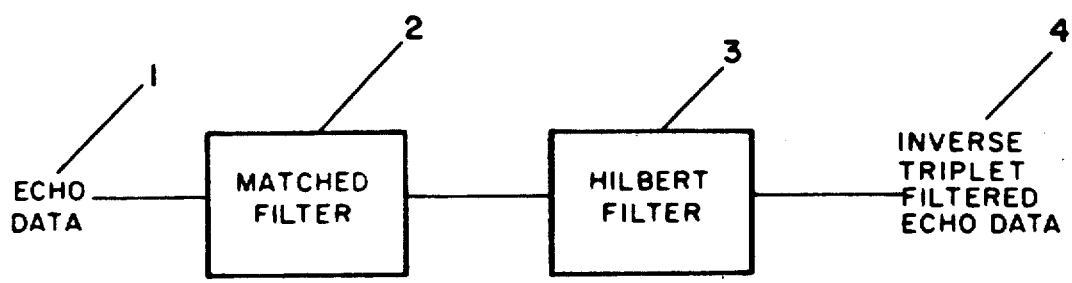
FIG — 49

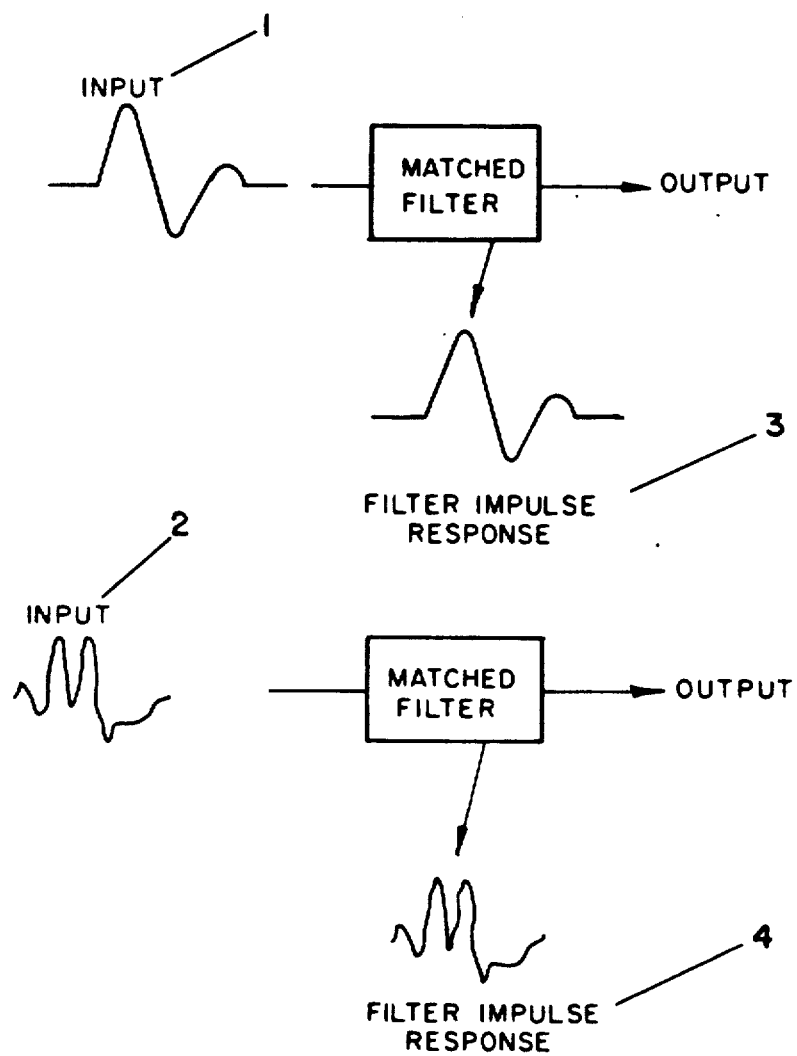
FIG — 50

$$\frac{dE4 - dE1}{V} = \text{DELAY 4}$$

$$\frac{dE3 - dE1}{V} = \text{DELAY 3}$$

$$\frac{dE2 - dE1}{V} = \text{DELAY 2}$$

REAL TIME 3D IMAGING DEVICE USING FILTERED ELLIPSOIDAL BACKPROJECTION WITH EXTENDED TRANSMITTERS

CROSS-REFERENCE TO RELATED APPLICATIONS

This patent application is a File Wrapper Continuation In Part of application Ser. No. 07/595,609 filed Oct. 12, 1990, abandoned (which concerns medical ultrasound imaging using large transmitters) is a continuation in part of pending patent application Ser. No. 07/387,615 filed Jul. 28, 1989 (which concerns filtered ellipsoidal backprojection) now U.S. Pat. No. 5,090,245 which is a file wrapper continuation in part of application Ser. No. 07/287,590 filed Dec. 15, 1988, now abandoned, which was a continuation in part of application Ser. No. 07/205,298 filed Jun. 10, 1988, now abandoned, which was a continuation in part of allowed application Ser. No. 07/106,577 filed Oct. 7, 1987 now U.S. Pat. No. 5,134,844 which is a continuation in part of application Ser. No. 06/858,696 filed May. 2, 1986 now U.S. Pat. No. 4,706,499.

It is also related to patent application Ser. No. 07/086,588 filed Aug. 17, 1987 now U.S. Pat. No. 4,817,434 (which concerns simultaneous multiple beam formation) which is a continuation in part application Ser. No. 06/799,424 filed Nov. 19, 1985 now U.S. Pat. No. 4,688,430 filed Nov. 19, 1985.

It also a continuation in part of pending patent application Ser. No. 07/480,324 filed Feb. 12, 1990 now U.S. Pat. No. 5,005,418 (which concerns multiple transmitters) which is a continuation in part of application Ser. No. 07/221,534 filed Jul. 19, 1988, now abandoned, which is a continuation in part of allowed application Ser. No. 07/106,577 filed Oct. 7, 1987 now U.S. Pat. No. 5,134,884 which is a continuation in part of application Ser. No. 06/858,696 filed May 2, 1986 now U.S. Pat. No. 4,706,499.

It is also a continuation in part of patent application Ser. No. 07/270,636 filed Nov. 7, 1988 now U.S. Pat. No. 5,027,658 (which concerns use of arbitrarily shaped pulses) which is a continuation in part of application Ser. No. 07/221,501 filed Jul. 19, 1988, now abandoned, which is a continuation in part of allowed application Ser. No. 07/106,577 filed Oct. 7, 1987 which is a continuation in part of application Ser. No. 06,858,696 filed May 2, 1985 now U.S. Pat. No. 4,706,499.

The above mentioned patents and also other any patents which issue on the above mentioned patent applications before this patent application issues into a patent are hereby incorporated by reference.

BACKGROUND OF THE INVENTION

1. Field of the Invention

This invention relates to the real time, three dimensional imaging of the anatomy using a single pulse of ultrasound or a reduced number of pulses of ultrasound—ie. a real time 3D medical ultrasound machine.

2. Description of the Prior Art

The above mentioned patents and patent applications (ie. mentioned in CROSS-REFERENCES TO RELATED APPLICATIONS) discuss 3D real time imaging and imaging using ellipsoidal backprojection. These describe, in detail, ellipsoidal backprojection using small transmitters which emit nearly spherical waves.

This patent application describes how to use large extended transmitters with ellipsoidal backprojection; and describes also how, when the large extended transmitter is carried to its logical extreme, ellipsoidal backprojection becomes paraboloidal backprojection.

An annular array can be used, in defocused mode, to synthesize a large extended transmitters of differing radius. Thus a very large number of transmitters can be synthesized using an annular array containing only a few actual transmitter elements.

The use of extended transmitters has a very significant advantage: It yields an increase in signal in signal to noise ratio due to a) the increased active area of the transmitter, b) the partial confinement of radiated energy to the imaged volume, and c) the decreased loss due to spherical spreading.

Extended transmitters can also have disadvantages: Residual edge waves cause come clutter in the echoes and, in the case of paraboloidal backprojection, only one transmitter can be used thus making unfeasible very large numbers of backprojections per reconstructed point.

Patent application Ser. No. 07/387,615 filed Jul. 28, 1989 describes filtered ellipsoidal backprojection with one or many small transmitters. The present patent application describes inverse triplet filtered ellipsoidal and paraboloidal backprojection with one or many large extended spherically curved transmitters. The inverse triplet filter allows real time, high resolution, low sidelobe level, three dimensional imaging with almost any type of finite duration transmitted pulse. In particular, pulse sequences that can be compressed upon reception can be used, with resulting improved signal to noise ratio, for example see "Ultra-wideband Radar" CRC Press, 1991. Also conventional 1½ to 3½ cycle damped sinusoidal ultrasound pulses can be used.

The following is a discussion of prior art, much of which discussion is common to the applicant's previous patents and patent applications:

The reconstruction technique described in U.S. Pat. No. 4,706,498 is essentially the backprojection of the echo samples over ellipsoids of revolution as will be more fully described in this application. The backprojections may be weighted as a function of the reconstruction point position to compensate for transmitter or receiver radiation patterns and other phenomena.

This imaging system can be implemented with nearly all commonly used types of transmitted pulses. The transmitted pulses that the imaging system may use also includes pulses with peaked autocorrelation functions that have a very small value except when the shift variable is near zero. These types of pulses will be termed "non interfering" or "interference free" for purposes of this application as there is little constructive and destructive interference and therefore strong grating lobes will not be formed when using a sparse array. A wideband white noise pulse is an extreme example. These types of pulses also can propagate relatively uniformly through a wide solid angle. Further discussion of these types of pulses may be found in "Random Data:Analysis and Measurement Procedures" by Bendat and Piersol.

The imaging system can also function with a class of pulses which will be termed "low interference" for purposes of this application. This type of pulse has relatively low constructive and destructive interference effects. The autocorrelation function is relatively peaked around zero with relatively low amplitude oscillations as the shift variable takes on non zero values and therefore high amplitude grating lobes will not be formed when using a sparse array.

Periodic, oscillating, "interfering" pulses of a particular class may also be used for imaging if additional echo processing occurs before image reconstruction (such as echo time history convolution with a matched filter impulse response) or without additional processing if some image degradation is allowable. The pulses must be of short enough duration to allow adequate lateral and range resolution. Thus, a pulse of several sinusoidal cycles may be used if the total pulse duration, or length, is of the same order as the required resolution. These types of pulses will be termed "short duration interfering" pulses. Alternately some types of long duration pluses can be compressed upon reception, for example chirped pulses. These, sometimes interfering type, pulses also work well with ellipsoidal and paraboloidal backprojection.

Patent application Ser. No. 07/106,577, which is a continuation in part of U.S. Pat. No. 06/858,696 further describes the Ellipsoidal Backprojection image reconstruction technique which is used for image reconstruction in U.S. Pat. No. 06/858,577.

Ellipsoidal projections provide a general theory for the analysis of active imaging systems, see "Active Imaging Greens Function" in Acoustical Imaging vol. 19, Imaging Press. Ellipsoidal Backprojection is a method for the active imaging of a three dimensional volume using a single transmitted pulse or greatly reduced number of transmitted pulses and is discussed in detail in the previously mentioned patents and patent applications. Referring to FIG. 1, a short pulse of energy is transmitted which radiates outward, as an expanding sphere, through a wide solid angle. Echoes are received by a sparse array of receiver elements and, typically, then digitized into echo samples. These samples (which may be filtered first) are then backprojected over ellipsoids through the image by one means or another. The results constitute, basically, the reconstructed image, although additional processing steps may be implemented.

Ellipsoidal Backprojection is a linear image reconstruction method, although the point spread function varies with location of the reconstruction point. The point spread function is the image of a point object as reconstructed by the imaging system. In a linear imaging system, the final, reconstructed image is, essentially, the convolution of the point spread function with the original object to be imaged. This is well known and is described in: Introduction to Fourier Optics—Goodman; Linear Systems, Fourier Transforms, and Optics—Gaskill; or the Fourier Transform and its Application to Optics—Duffiuex.

The point spread function determines the imaging capabilities of a linear imaging system. Ellipsoidal Backprojection alone can yield an adequate point spread function for some applications, however, a particular type of linear filter, the "inverse triplet filter" (discussed in detail here), may be applied to the echo time histories, before backprojection, which greatly improves the resolution while substantially reducing the sidelobe levels. The resulting imaging system is still linear.

SUMMARY

This invention will provide a three dimensional image after transmitting a single pulse (or reduced number of pulses) of energy using the echoes received by a closely spaced or sparse array of receiver elements. It can use small point like transmitters, one or more annular array transmitters, large curved transmitters or a large flat transmitter. The use of point like transmitters are discussed in detail in the other patents which have been incorporated by reference and are discussed further here. The use of large transmitters is discussed in detail here.

It will image a three dimensional volume in realtime or near real time and provide a means of reconstructing a three dimensional image of objects using echoes resulting from the transmission of a single pulse (or multiple pulses) or energy while avoiding grating lobes when using a sparse array of receiver elements.

It uses a reconstruction technique based on the speed of propagation of waves generated by the transmitter and reflecting points on objects. Each echo sample at each receiver element represents the integral of the imaged object field over an ellipsoid (or paraboloid) of revolution. Thus the echo samples are projections of the field of objects over ellipsoids (or paraboloids) of revolution. Reconstruction is done by backprojection of these projections. The backprojection algorithm is simple and fast. Various filters may be applied to the echo samples before backprojection. These filters can sharpen the image, reduce the sidelobe levels, or compensate for propagation phenomena. The inverse triplet filter is particularly effective.

Some additional objects of this invention are:

To illuminate or insonify a wide angular volume uniformly with the transmission of a single pulse of energy.

To provide a means of viewing three dimensional data on a two dimensional display.

To provide a means for reconstructing an image which provides relatively uniform resolution throughout the imaged volume.

To use a simple reconstruction method which uses one geometrical step.

To use a reconstruction method which can be based on rectangular coordinates although other coordinate systems (such as polar or cylindrical, etc.) can sometimes be used to greater advantage.

To reconstruct the image of objects causing echoes directly from the stored time history of echoes received at each element of the receiver array.

To use a reconstruction algorithm which uses the combined distances from the transmitter to the reconstruction point and from the reconstruction point to the receiver element as a basis for reconstruction.

To reconstruct three dimensional images and tomographic images from the array element time histories without the use of large intermediate memories.

To use a reconstruction algorithm which can reconstruct points in any order within the insonified three dimensional volume and thus facilitate the reconstruction of variously oriented volumes and tomograms viewed from various perspectives.

To use a reconstruction algorithm which inherently takes into account the wavefront curvature of the transmitted pulse.

To use a reconstruction algorithm which makes no Fresnel, Fraunhofer, or similar approximations.

Further objects and advantages of this invention will become apparent from consideration of the drawings and descriptions of the preferred embodiment.

BRIEF DESCRIPTION OF THE DRAWINGS

FIG. 7 shows time history memory elimination

FIG. 8 shows 3D memory elimination.

FIG. 9 further shows 3D memory elimination.

FIG. 10 shows an object oriented display.

FIG. 11 shows elimination of both 3D and time history memories.

FIG. 12 shows multiple transmitters.

FIG. 13 shows multiple redundant pulses/summing into echo time history memories.

FIG. 14 shows multiple redundant pulses/summing into image pixels.

FIG. 15 shows an echo recording device.

FIG. 16 shows oscillation compensation.

FIG. 28 shows reconstruction address generation for multiple transmitters.

FIG. 29 shows different transmit and echo velocities and the method of time history address generation.

FIG. 30 shows an arbitrary three dimensional array.

FIG. 31 shows the transmission of a wideband random pulse.

FIG. 32 shows nonlinear processing.

FIG. 33 shows the transmission of an oscillating pulse.

FIG. 34 shows backprojection image reconstruction using an oscillating transmitted pulse.

FIG. 35 shows quasi specular reflection with an oscillating transmitted pulse.

FIG. 36 shows non interfering pulses.

FIG. 37 shows low interference pulses.

FIG. 38 shows short duration interfering pulses.

FIG. 39 shows an autointerference function.

FIG. 40 shows backprojection of interfering pulse echoes.

FIG. 41 shows backprojection of interfering pulse echoes.

FIG. 42 shows backprojection of interfering pulse echoes.

FIG. 43 shows ellipsoidal eccentricity and spheres.

FIG. 44 shows a non sparse array with closely spaced elements.

FIG. 45 shows alternate means of echo sample combination.

FIG. 46 shows the Hilbert Filter impulse response.

FIG. 47 shows Hilbert Filters.

FIG. 48 shows triplet echo data.

FIG. 49 shows the inverse triplet filter.

FIG. 50 shows a matched filter.

DESCRIPTION OF THE PREFERRED EMBODIMENT

Description Of The Basic Embodiment (Medical Ultrasound Imaging)

Figure 1:
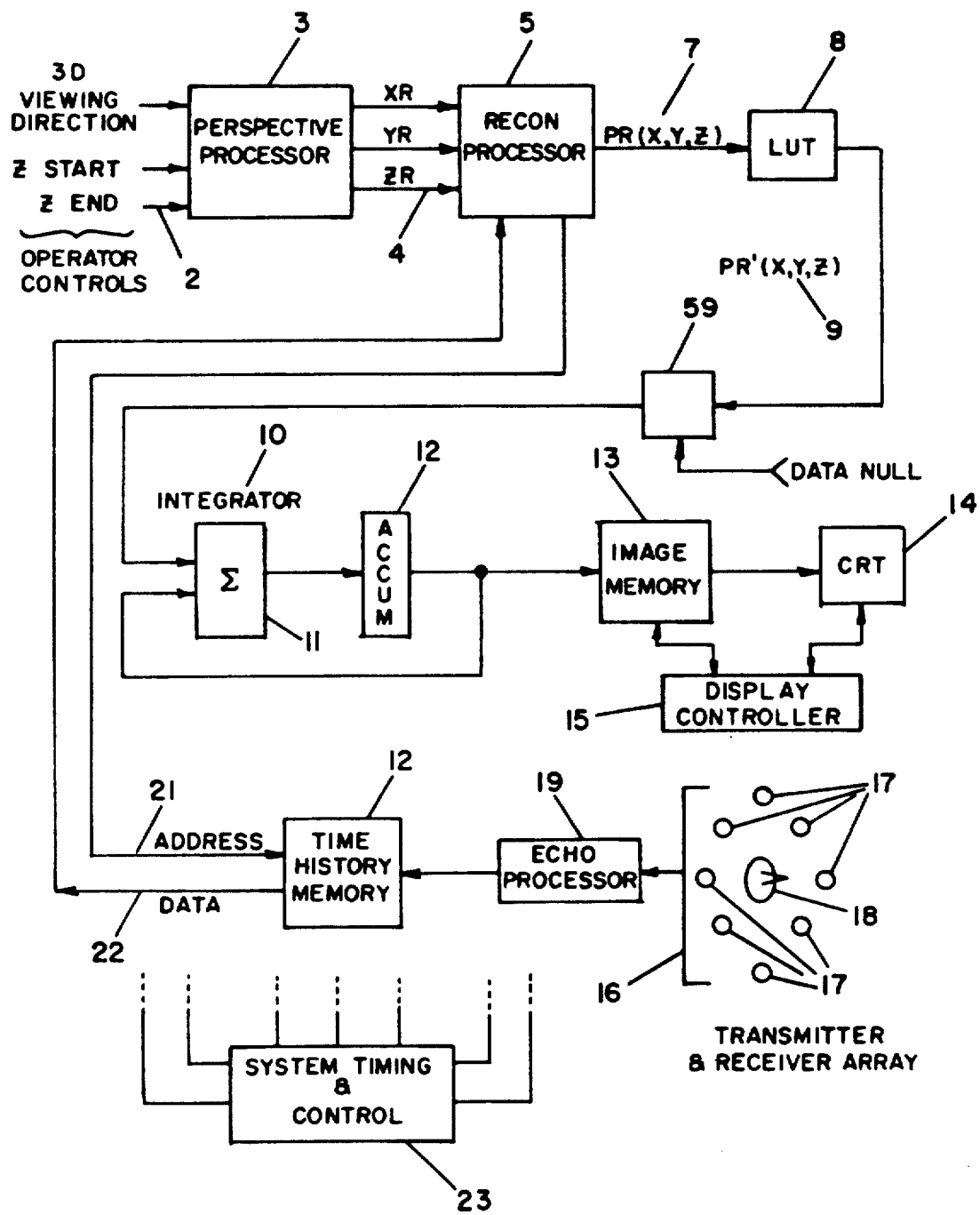
FIG. 1 shows a block diagram of the single pulse imaging system.

The apparatus described herein is a means of imaging three dimensions with the transmission and reception of a single pulse of ultrasonic energy. FIG. 1 is a system block diagram. A single transmitting element (18) is located at the center of a sparse circular array (17) of receiver elements. The transmitter emits a single unipolar pulse of energy. An example of the method of generation of such a pulse, and experimental results can be found in "Electronic Circuit for High Frequency and Broad Band Ultrasonic Pulse Echo Operation" by Platte et al in Ultrasonic 1987 vol 25 March. A multicycle pulse may be used if the echoes are converted to unipolar pulses by rectification at the receiver elements before further processing occurs. A multicycle pulse may also be used without rectification, for example 1½ or 2½ damped cycles of a sinusoid. Also a wideband noise like pulse may be used. The pulse shape may be a half cycle sinusoid, a gaussian pulse or any other monopolar pulse. A gaussian shape is efficient in that it contains a relatively small higher harmonic content. If a single cycle or multicycle pulse is used with a small transmitter element or a spherically curved extended transmitter, a wide solid angle may be insonified uniformly. Then these pulses may be considered noninterfering or relatively noninterfering pulses for the purpose of insonification of the imaged volume and for the purpose of this application. This is illustrated in U.S. Pat. No. 4,688,430. Most mediums to be imaged attenuate higher frequencies more than lower frequencies. The ratio of the diameter of the transmitter to the length of the transmitted pulse determines the size of the solid angle that will be insonified uniformly. In other embodiments a transmitter which is large compared with the pulse length may be used if it is curved (or defocused) so that the radiated pulse is spherical. With a large transmitter the edge waves must be attenuated or otherwise accommodated.

As the pulse propagates away from the transmitter, objects in its path will generate echoes that propagate back toward the receiver array. These echoes are detected by the elements (17) of the receiver array. Because a unipolar pulse is used, the receiver array elements may be spaced far apart creating a large sparse aperture which will have better lateral resolution than the same number of elements configured into a dense array. With a unipolar pulse (or any non interfering pulse) no grating lobes will occur.

A sparse array is an array of elements that, for the purposes of this application, are placed no closer together that one half the spatial length of the transmitted pulse.

Figure 17:
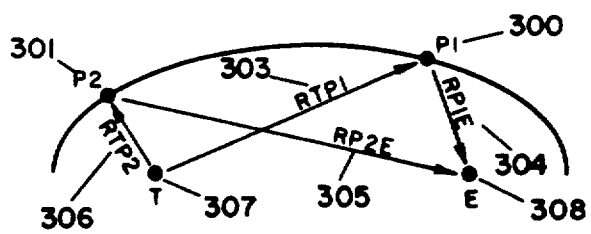
FIG. 17 shows the echo geometry.
Figure 18:
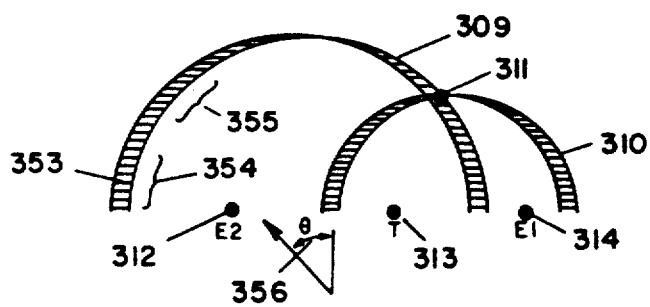
FIG. 18 shows echo and reconstruction geometry for two receiver elements.
Figure 19:
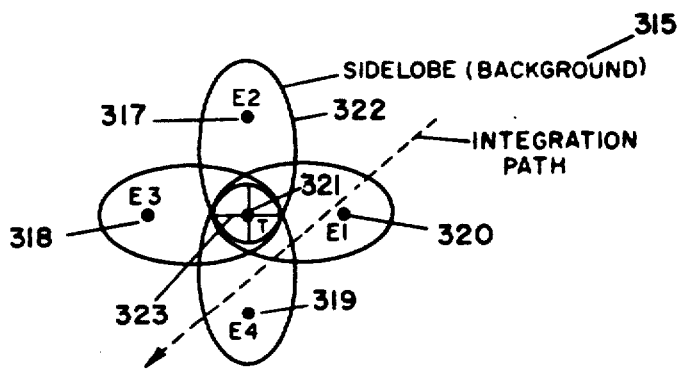
FIG. 19 shows Echo and reconstruction geometry for four receiver elements.

The echoes detected at each receiver element are amplified, processed and digitized by the echo processor (19) and then stored in time history memory (12). They may also be stored in an external memory such as a disk drive for later use. These echo samples are projections over ellipsoids of revolution of the imaged objects as is shown in FIGS. 17,18,19.

A pulse is generated by the transmitter. It propagates though the object field as an expanding spherical surface of radius RTP (FIG. 17-303,306). As the surface encounters points in objects (FIG. 17-300,301), wavelets of radius RPE (FIG. 17-304,305) are generated which propagate back toward the receiver elements (FIG. 17-308, FIG. 18-312,314, FIG. 19-317,318,319,320). These are echoes which are detected by the receiver elements and recorded in the time history memories (FIGS. 1-12). The elapsed time from pulse transmission to an echo sample defines the round trip distance, RTP+RPE, from transmitter to reflecting point and back to the receiver element (FIG. 17-303,304). There are numerous points which can contribute to a particular echo sample. These points, specifically, are all of the points which lie on an ellipsoid of revolution with the foci being the transmitter and the particular receiver element (FIG. 17-302). The eccentricity is determined by the round trip distance which is also equal to the major axis. Therefore each echo sample from each receiver element represents a projection of the object field over an ellipsoid of revolution (FIG. 17-302, FIG. 18-309,310, FIG. 19-322).

system timing and control (23) synchronizes, controls and coordinates the various elements of the imaging apparatus. The perspective processor (3) is responsive to the operator controls (2) which determine the direction or perspective from which the final image will be viewed. The perspective processor also allows the operator to determine the thickness of the three dimensional volume which will be viewed on the final two dimensional display (14). This is done by removing front portions and rear portions of the image in a direction orthogonal to the viewing screen (14). The thickness of the portions to be removed are determined by the z start and z end operator controls (2). By using these controls the image may be reduced to a tomogram located at any position orthogonal to the viewing screen. The three dimensional viewing direction is also an operator control (2) and allows the imaged volume to be viewed from the front, back, top, bottom, right side, or left side. This, in conjunction with the z start and z end controls, allow viewing of the imaged volume from six different directions and also allow viewing volumetric images of various thicknesses, positions and orientations in addition to tomographic images of various positions and orientations. The perspective processor (3) sequences the three dimensional reconstruction points (4) that are fed to the recon processor (5). It does this in such a manner that fixed sequences of reconstructed points (7) may be summed by the integrator (10) and the results stored in the accumulator (12) to form one pixel at a time of the final two dimensional view through the three dimensional volume.

The look up table (8) provides a means for shading the two dimensional view through the three dimensional volume so that a front to back gray scale perspective is formed. The look up table can also be used for other image processing functions by programing its contents with other values. The look up table mapped, reconstructed points (9) are fed to the integrator (10). The added (11) sums these points with the data in the accumulator (12) and replaces the data in the accumulator with the results. This process constitutes a weighted integration of the reconstructed three dimensional volume in a direction orthogonal to the screen of the final two dimensional display (14). The integrated three dimensional data sequences each form one pixel in the two dimensional image memory (19). The data in this memory is converted to a composite video signal by the display controller (15) and is used to drive the cathode ray tube circuits (14).

DETAILED DESCRIPTION OF THE PREFERRED EMBODIMENT

Figure 3:
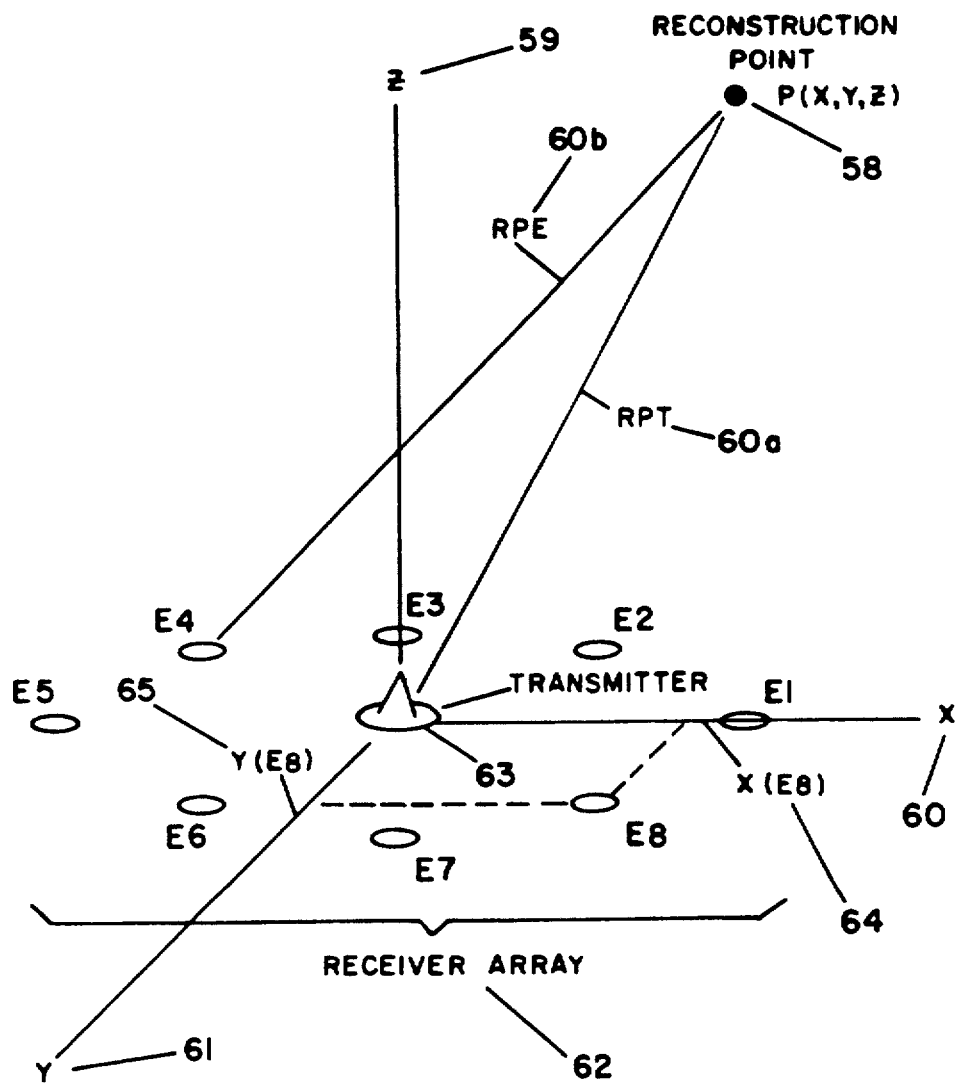
FIG. 3 shows the reconstruction geometry including transmitter and receiver and also the particular point to be reconstructed

FIG. 3 is a drawing of the reconstruction geometry. The receiver array is in the x y plane and consists of a sparse array of receiver elements (62) evenly spaced on the circumference of a circle. Thus in this embodiment the receiver is an axicon constructed with a sparse array. The transmitter (63) is located at the origin of the x y z coordinate system and transmits a pulse in the z direction. An example reconstruction point is shown at (58). RPE (60b) represents the distance that an echo must travel from the reconstruction point (58) to receiver element E4. RPT (60a) represents the distance that an acoustic pulse must travel from the transmitter (63) to the reconstruction point (58). The sum of RPE and RPT defines the major axis of an ellipsoid of revolution, FIG. 17-302.

Figure 6:
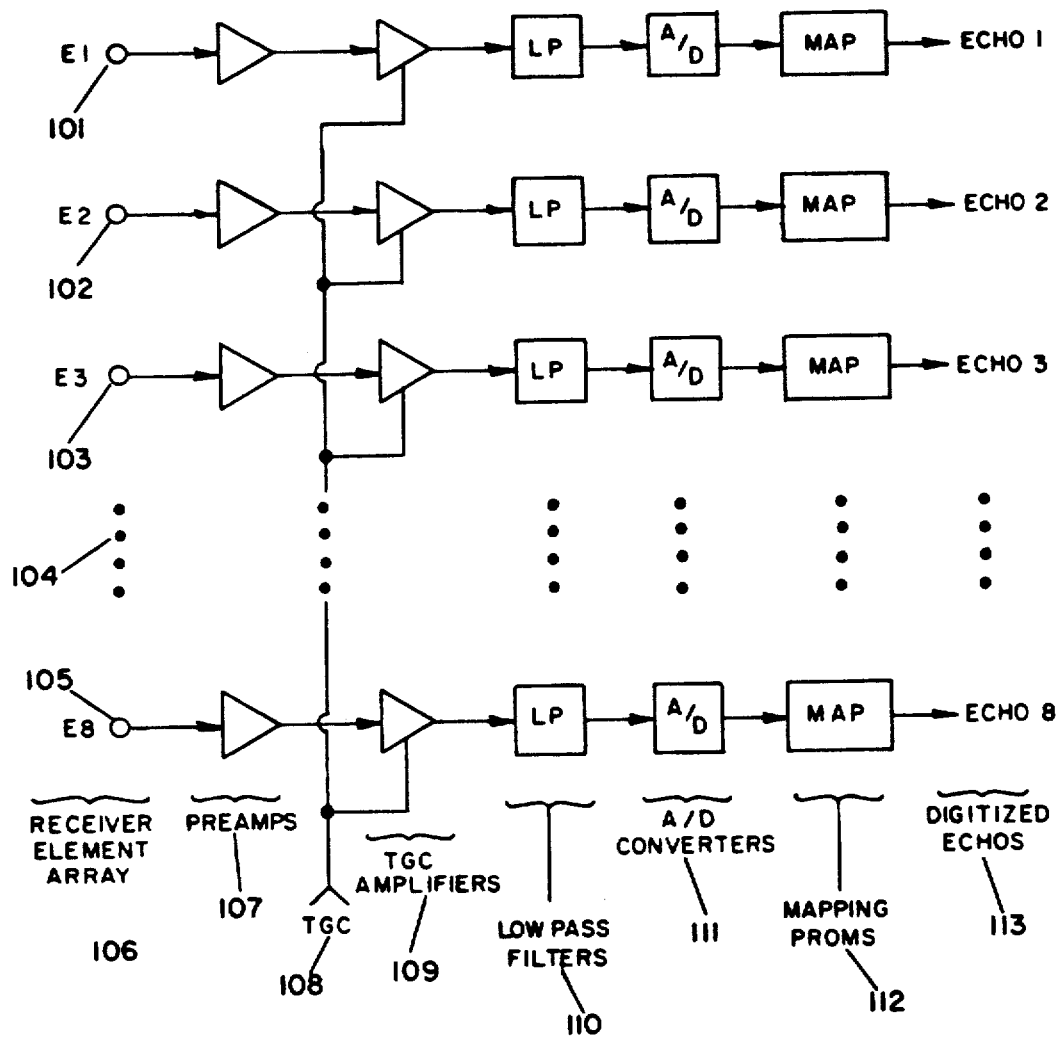
FIG. 6 shows the echo processor which first receives the echo data from the receiver elements.

FIG. 6 shows the echo processor which receives echo data from the receiver arrays elements (106). The preamplifiers (107) increase the magnitude of the echoes to reduce the effects of noise further along in the system. The time gain compensation amplifiers (109) provide a time varying gain to compensate for attenuation in the imaged medium which is a function of the echoes time in flight and also, spherical spreading loss. The tgc input (108) consists of an adjustable ramp, or function with adjustable shape, which increases the gain for echoes coming from reflectors further away from the receiver array. The low pass filters (110) will prevent aliasing and reduce noise. The analog to digital converters (111) convert the echoes to digital samples. The mapping proms (112) can be used for various types of dynamic range compression or expansion while the data is in sampled wavefield form. The output signals are the digitized echo samples (113). Each sample represents a projection of the object field over an ellipsoid of revolution, refer to FIGS. 17,18,19.

FIG. 1 (19) shows the time history memory which receives the processed and digitized echo data from the echo processor. This memory consists of two alternating memories, one being read into while the other is being read out of. The data in the memory is a sampled and processed, but geometrically distorted, replica of the time history of the wavefield incident on the surface of the receiver array.

FIG. two is a block diagram of the perspective processor. The perspective processor controls the direction from which the three dimensional imaged volume is viewed. It also controls the thickness of the tomographic images and their location within the imaged volume and, in addition, the thickness of the tomogram. The count sequence control (33) accepts inputs from the operator controls (24) and configures the counter control lines (34a), (35), (34b), (35b), (34c), (35c) to the address sequence counters (37), (38), (39). It does this such that the correct sequence of reconstruction point addresses (43), (44), (45) are fed to the recon processor. The counter control lines configure the counters in count up or count down mode, preset them to the correct value, and determine the interconnection of the carry in and carry out signals. The thickness control (58) accepts z start (31) and z end (32) operator controls and monitors the counter values (46), (47), (48) by loading comparison values (55), (56), (57) into the comparators (49), (50), (51). If the counter values are outside the range as determined by the z start (31) and z end (32) controls it activates the data null signal (59) which causes data values of zero to be fed into the integrator FIG. 1, (59), (10).

Figure 4:
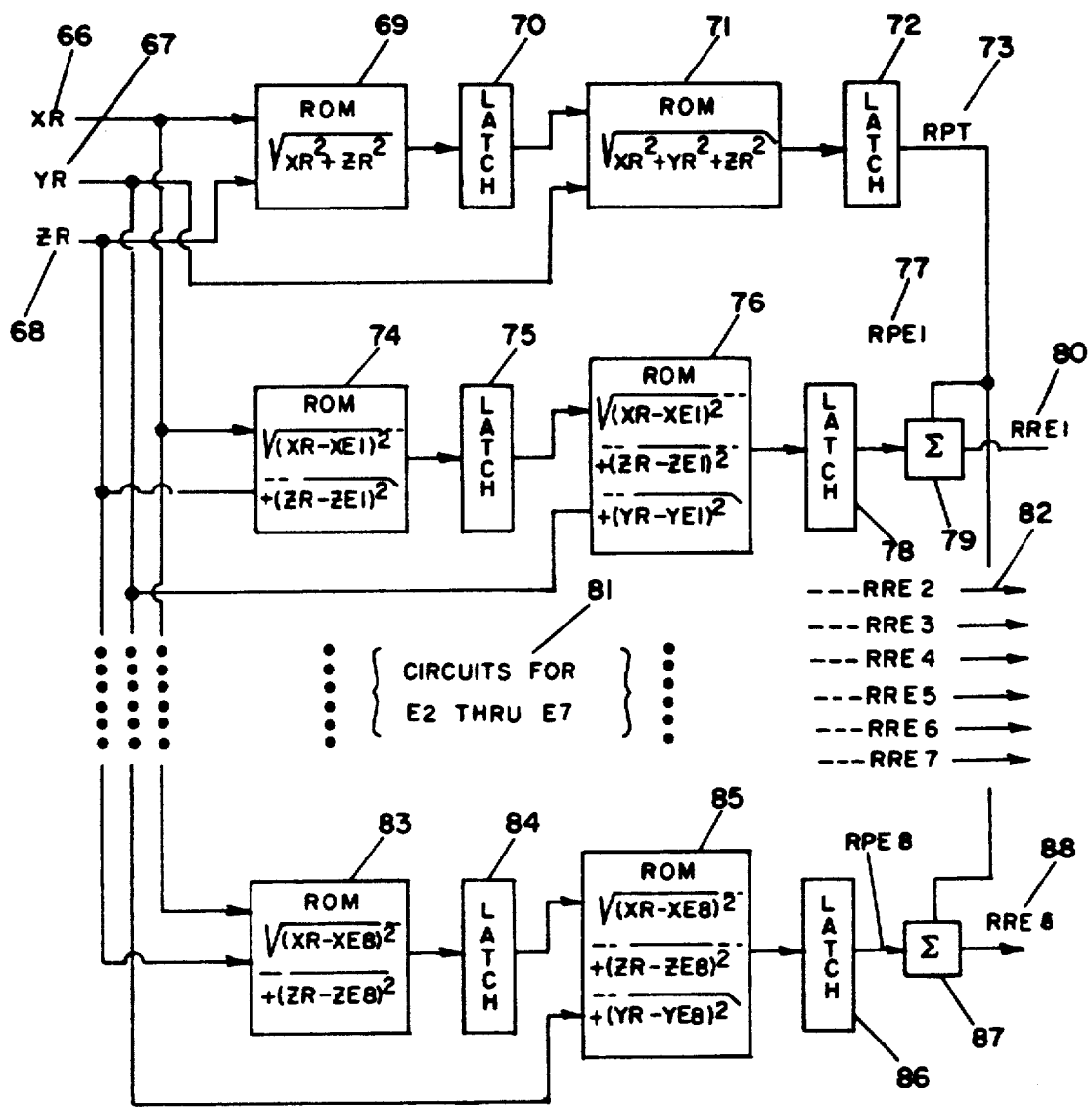
FIG. 4 shows the reconstruction address generator which takes the reconstruction point coordinates as an input and computes the appropriate time history addresses as outputs.
Figure 5:
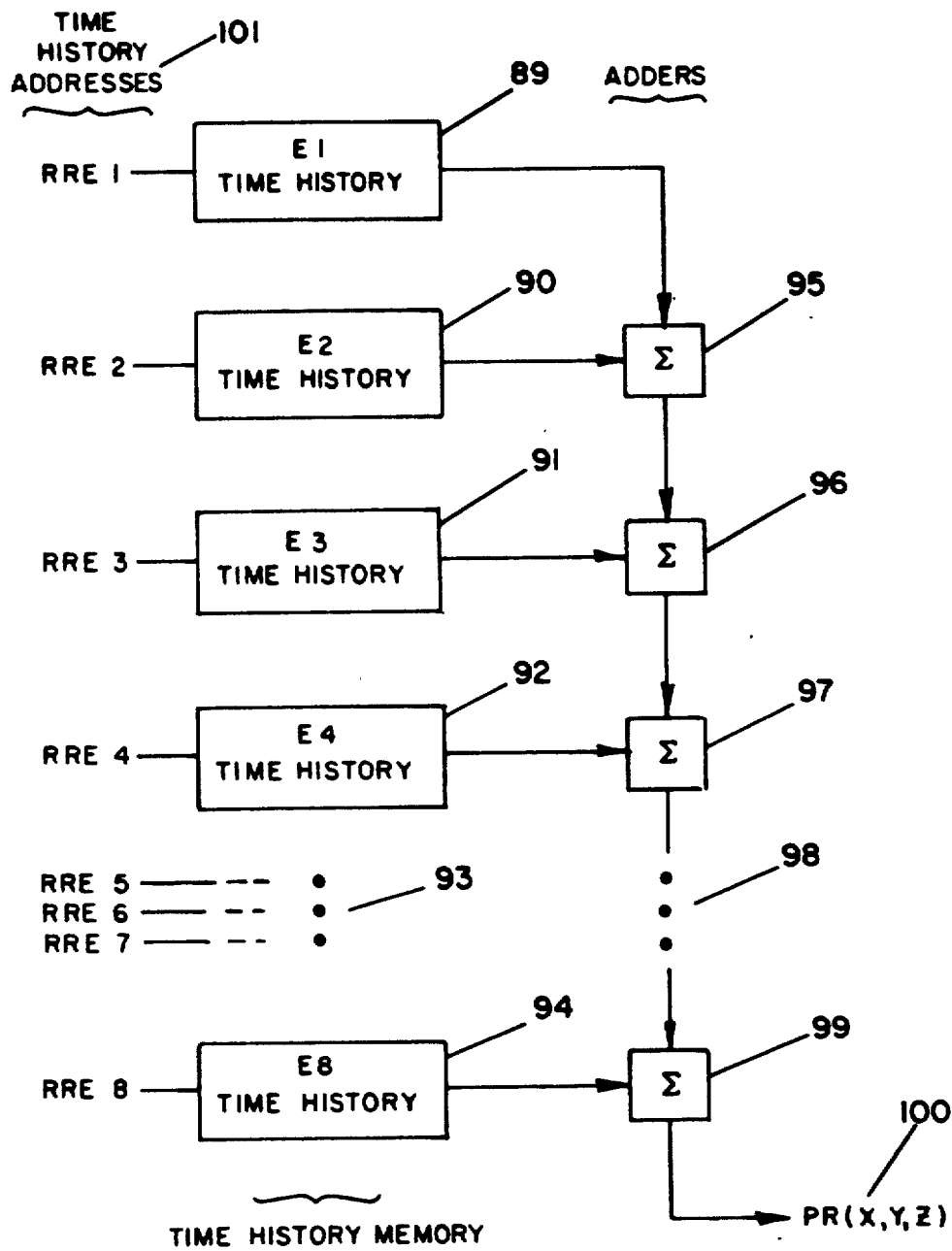
FIG. 5 shows the reconstruction summer which sums the appropriate time history data together to reconstruct an object field point.

FIG. 4 is a block diagram of the reconstruction address generator. The reconstruction address generator sends a stream of addresses to the reconstruction summer (FIG. 5) which controls the way in which the time history memory data (FIGS. 1-12) is summed to reconstruct image points. The reconstruction algorithm is implemented in hardware by programmable logic and is a parallel pipelined structure. For each point to be reconstructed in the three dimensional volume (xr,yr,zr) (66,67,68) the recon address generator computes the appropriate addresses for the recon summer (FIG. 5). Given the reconstruction point coordinates and the time of flight, or equivalently (within a multiplicative constant factor, the total travel distance), the distance from the transducer to the point rpt (73) is computed by the two programed roms (69, 71). To minimize rom size the first rom computes the distance to xr,zr and the second rom takes this distance and the zr coordinate and computes the final distance rpt. The rest of the rom circuitry is used to compute the distances from the reconstruction point to each of the receiver elements. Their are eight sets of roms similar to the two roms (74, 76). Each set is programmed to compute the distance for one of the eight receiver elements e1 through e8 (FIG. 3). The first rom of each rom pair computes the distance projected in the x z plane and the second rom takes this distance along with the y coordinate of the reconstruction point and computes the final distance rpe (77). The summers (79, 87) sum two the distances together to form the total distance from transmitter to reconstruction point to receiver element for each receiver element in the receiver array. This combined distance defines the major axis of an ellipsoid of revolution upon which lie the points responsible for echoes which make up a single echo sample. Then, each sample at each receiver element has a total travel time and total travel distance associated (FIG. 17-303,304,305,306) with it which defines the eccentricity of the ellipsoid (FIG. 17-302, FIG. 18-309,310, FIG. 19-322). The coordinates of the particular receiver element and the coordinates of the transmitter define the locations of the two foci (FIG. 17-307,308, FIG. 18-312,313,314, FIG. 18-317,318,319,320,321). Thus each sample from each receiver element has a unique ellipsoid of revolution associated with it. The sample represents the surface integral of the object field over this ellipsoid.

The speed of sound is used as a scale factor in producing the output addresses (80, 82, 88) which are sent to the reconstruction summer (FIG. 5). The round trip distance divided by propagation velocity divided by the sample interval gives the sample location in the time history memory. The separate rom pairs for each element form the parallel architecture whereas the latches (70, 72, 75, 77, 84, 86) form a pipelined architecture in that the reconstruction speed is governed by the single slowest element in the circuit rather than by a sum of circuit element delays.

FIG. 5 shows the reconstruction summer (recon summer) which adds the appropriate time history data together to reconstruct each image point. The time history addresses (101) are generated by the reconstruction address generator (FIG. 4) and cause the appropriate data to be accessed in each elements time history memory (89, 90, 91, 92, 93, 94). This data is summed by the adders (95, 96, 97, 98, 99) to form the reconstructed point pr(x,y,z) (100).

This reconstruction summation process constitutes the backprojection of time history samples over ellipsoids of revolution (FIGS. 18,19) in the same manner that the time history samples represented projections of the object field over ellipsoids of revolution. It is the inverse of the original sampling process. The eccentricity of the back projected ellipsoids is determined by the distance from transmitter to reconstruction point and back to the particular receiver element from which the time history was generated (FIG. 17-303,305). The foci of the ellipsoids are the locations of the transmitter and the particular receivers (FIG. 19-317,318,319,320,321). The reconstructed point and its sidelobe structure is the summation of backprojected ellipsoids from each of the receiver elements, refer to FIG. 18.

The previously described image reconstruction method, for purposes of this patent application, is termed "ellipsoidal backprojection". Referring to FIG. 43, it can be seen that if the transmitter (524, 525, 528) do not coincide, the projections (521, 522, 523) are ellipsoids (521, 522). If they do coincide (528) the projection is over a sphere (523) which is a special case of the ellipsoid. The term "ellipsoidal backprojection" will be confined to the case where at least some of the projections are over non spherical ellipsoids (521, 522).

The image of a single point gives the system point spread function. The point spread function for this imaging system varies with reconstruction point location. The system is not isoplanatic. However, if the method of combining echo samples is addition, the system is linear. Then the resultant image is the convolution of the spatially varying point spread function with a perfect image of the objects in the imaged 3D volume.

FIG. 1 which is a system block diagram shows the integrator (10), the image memory (13), the crt display (14), and the display controller (15). These components function together to provide a display of the three dimensional imaged volume or selected tomographic images. The integrator receives reconstructed points from the reconstruction processor (5) in a sequence consisting of subsequences such that the summation of each subsequence forms one pixel for the two dimensional display. Each pixel then represents a view along a line through a three dimensional volume. The integrator forms these subsequence summations by using results fed back from the accumulator (12). The resulting pixels are placed in the appropriate locations in the image memory (13). The image memory consists of two alternating memories, one in read mode and one in write mode. The display controller (15) forms a compatible video signal using the data in image memory and the video synchronization signals. This video signal is fed to the cathode ray tube (14).

Elimination of the Time History Memories
Refer to FIG. 7

Here the object is to sum echo samples immediately, as they are sampled, into the appropriate reconstruction points. This constitutes the immediate backprojection of the echo samples over ellipsoids in the 3D image memory. If this is done, no time history memory is required.

Since the image reconstruction comprises backprojection of the echo samples over ellipsoids, the reconstructed image is the superposition of ellipsoids, one for each echo sample collected. As the echo samples are taken, they may immediately be summed into the appropriate voxels in the 3D image memory. Each echo sample will be summed into every voxel intersected by the ellipsoid associated with sample. This requires circuitry (and/or a ROM look up table) which uses the equation of the ellipsoid (for example see "Calculus with Analytic Geometry" Johnson and Kiokemeister) to compute the appropriate voxel addresses.

Each echo sample (114) is summed by the added (115) into the appropriate voxel (117) in the 3D memory (116). In the illustrated implementation there is a separate 3D memory for each receiver/transmitter combination (Ei,Tj). This provides maximum reconstruction rates, but may require too much electronics if there are many receiver/transmitter elements. A single common memory may be used if it is multiplexed or time shared by echo samples from different receiver elements.

The look up table (120) controls the voxel addresses (118,119) for the 3D memory. Since there are several voxels into which a given echo sample will be summed, the point number input (143,138) selects among the several voxels allowing the sample to be summed into each of them in sequence. The contents of the lookup table is determined by the equation (140) which gives the points on an ellipsoid given the sample number (121,137) and the transmitter/receiver elements coordinates.

The individual 3D memories (122,123,124,125) voxels (126,127,128,129) are summed by adders (130,131,132,133,134) into the final 3D memory (136).

Elimination of the 3D Memory
Refer to FIGS. 8 and 9

This design option will sum the echo samples (144,184), either from time history memories or directly as the echoes are sampled, into the appropriate pixel locations in the tomogram image in the tomogram memory (147) and the shadowgraph image in the shadowgraph memory (186). This eliminates the requirement for a 3D memory.

Alternately, the reconstruction points may be reconstructed in a register and then directly transferred to the appropriate locations in the tomogram memory and summed into the appropriate locations in the shadowgraph memory.

If echo samples are summed into a tomogram memory an additional added (350) is required.

The figures show the direct writing of reconstructed points into the memories. In synchronism with the reconstructed points are the reconstructed points' coordinates (145,191). The coordinates are input to the tomogram processor (149) and the shadowgraph processor (190). The tomogram processor has an additional inputs, the tomogram position (150) and the tomogram orientation (151). The shadowgraph processor has an additional inputs, the viewing orientation (192) and the viewing position (193). Both processors generate write pulses (146,188) and memory addresses (148,169).

The tomogram processor contains lookup tables derived from the equation of a plane (351). The tomogram orientation inputs (171) provide the coefficients, alpha, beta and gamma (172,173,174), for the equation. These are multiplied (175,176,179) by the reconstructed point coordinates (180,181,182) and summed by adders (177,178) to form the left side of the equation (170). The tomogram position (169) provides the constant factor (167) after being scaled by a lookup table (168). The opposite sides of the equation are tested for equality by the comparator (166). Equality is anded (164) with a write clock (163) to generate the write pulse (165).

The tomogram processor also generates memory addresses (148,152,153). The reconstruction point coordinates (161,158,159,160), tomogram position and tomogram orientation (156,157,162) are inputs to prom based algorithm processors (154,155) which generate the addresses (152,153).

The shadowgraph processor (190) takes the reconstruction point coordinates (200), the starting viewing position (203) and the viewing orientation angles (204,205,206), associated with the x,y,z base coordinates, and formulates the equations (194) of straight lines which represent the line integrals which will become pixels in the shadowgram. The raster generator (214) generates a sequence of pixel addresses (212,213) representing the pixels in the shadowgram. These are used in conjunction with the shadowgram position (203) by the vector tail generator (202) to generate the vector tail addresses (201). The vector tail addresses are subtracted (199) from the reconstruction point coordinates (200). The result (198) is one input to a three stage comparator (197) which will generate a memory write pulse (195). The vector incrementor (211) increments a parameter (210) which is multiplied (207,208,209) by the shadowgraph orientation angles (204,205,206). The results are the other input (196) to the three stage comparator.

Elimination of Both 3D and Time History Memories
Refer to FIG. 11

This design variation will sum echo samples directly into the tomogram and shadowgraph pixels without using echo time history memories or a 3D memory.

An additional equation, related to the perspective viewing direction, may be combined with the equation of FIG. 7, yielding a resultant equation which can be used to construct all of the 2D pixel addresses that a given echo sample should be summed into. As before, as the echo samples are taken, they may immediately be combined into the 2D image without an intermediate time history memory or three dimensional memory.

The technique is the combination of the foregoing techniques to eliminate each of the two memories separately. The echo samples (232) from each of the n elements (230,231) are transferred directly (233) to the tomogram summer (352) and the shadowgraph summer (238). The tomogram processor (236) controls the tomogram memory write pulses and addresses (235). The shadowgraph processor (237) controls the shadowgraph read/write pulses and addresses (242). The summer (238) combines the echo samples (233) with memory locations (240) to reconstruct pixels and perform the integration (241).

Object Orientated Display

Refer to FIG. 10

This display technique allows the tomogram, the shadowgraph and the graphics display to be maintained as separate objects to be combined into the rs170 video signal. This eliminates the need for a separate complete display memory and allows the display objects to be repositioned (229) or modified separately by the user.

The three separate image objects' (215,216,217) addresses and read pulses (224,225,226) are controlled by the rs170 processor (227) which also controls (223) the multiplexer (221). The processor, as the rs170 pixel scan progresses, combines pixel (222) into the rs170 video signal, as appropriate, from either the tomogram (218), shadowgraph (219) or graphics (220) memories.

Signal To Noise Improvement With Echo Time History Integration and Redundant Transmitted Pulses

Refer to FIG. 13

Integrating an image over several frames is a technique commonly used to increase the image signal to noise ratio. If the noise is uncorrelated from one frame to the next, the signal to noise ratio is increased by the square root of the number of integrations. For each frame integration this involves summing each new pixel with each old pixel. For a three dimensional image this would be time consuming because of the large number of pixels.

This invention uses a reconstruction technique and system architecture that allows the same type of signal to noise improvement without having to sum individual pixels. Consecutive frames may be integrated by summing in the time history memories instead of the image memory and the effects will be similar. There is much less data stored in the time history memories before image reconstruction which greatly reduces the number of additions required for a full frame integration. This saves hardware and processing time.

Referring to FIG. 13, the time history memories (251,252) contain the echo time history from the last transmitted pulse. As new echoes (247,248) are received from a new transmitted pulse, the echo samples are added (249,250) to their counterparts from the last transmitted pulse. This can be continued indefinitely if the addition results are shifted right as the addition results fill up the capacity of the individual time history memory locations.

Signal To Noise Improvement With Image Integration and Redundant Transmitted Pulses (and "reduced pulse three dimensional imaging")

Refer to FIG. 14

As before, since in some imaging applications there is time for more than one transmitted pulse per image frame, multiple pulses may be transmitted and the resulting echoes combined into the same image to provide increased signal to noise ratios. Rather than "single pulse three dimensional imaging" this will be termed "reduced pulse three dimensional imaging" since the image will be formed after the transmission of a smaller number of pulses than would be required in conventional imaging systems. This same terminology applies when ever multiple redundant pulses are used as in the previous descriptions of signal to noise improvement techniques.

The echoes from each pulse may be used for a complex image reconstruction. The reconstructed pixels or voxels may then be summed into the previously reconstructed image. The process may be repeated for several transmitted pulses.

The reconstructed image points (255) are sent to summers (256,257) for the tomogram memory (258) and the shadowgraph memory (259). The summer perform the integration of image points resulting from several transmitted pulses.

Sidelobe Reduction With Multiple Offset Transmitters

Refer to FIG. 12

Sidelobes are created in the point response of the imaging system when back projected ellipses coincide at locations other than the actual location of the reconstruction point, refer to FIGS. 17-302 and 18-309. Integration of consecutive frames does not reduce the sidelobe level of the same elements are used for transmission and reception each time.

However, if the transmission originates from a different location, because of offset transmitters, in each consecutive transmitted pulse, then, for a particular receiver element and particular reconstruction point, the back projected ellipse will coincide only at the location of the reconstruction point.

Then, when integration over consecutive frames is done using multiple offset transmitters, the sidelobe levels will be reduced. The amount of the sidelobe reduction is proportional to the number of frame integrations with transmissions originating from offset transmitters and is therefore proportional to the number of offset transmitters.

The total number of non coincident (or independent) ellipsoids passing through and intersecting an image reconstruction point will be equal to the number of receiver elements times the number of multiple offset transmitter elements. The equivalent peak sidelobe level will be reduced proportionately.

The receiver elements (244) may be used as the multiple transmitters (243) or a separate transmitter array (245) may be used with the receiver array (246).

Receiver Elements Used As Transmitters

Refer to FIG. 12

The previously described embodiments show transmitters that are separate from the receiver elements. However, if the receiver elements can also be used as transmitters, a complete transmit receive array could be formed by a circular array of elements (244). Each element in the array (243) could be used, one at a time, consecutively for pulse transmission. If consecutive frame integration was implemented, sidelobe reduction and signal to noise improvement would be achieved without increase in the number of array elements.

Weighted backprojections to compensate for element radiation patterns and other phenomena.

Refer to FIGS. 7,17,18,19

Backprojections may be weighted (400) as a function of the sample number (total round trip time of flight, RTP+RPE) (402) or as a function of the reconstruction points coordinates (401) or both.

The transmitter and receiver elements have radiation patterns which may be partially compensated for by weighting the backprojections as a function of the reconstruction points coordinates. Finite area transmitter/receiver elements cause an actual backprojection pattern that is wider in the off axis direction (353,354). The echo sample represented by the backprojected ellipsoid can then be weighted as a function of the off axis angle (356) as it is summed into the various reconstruction points.

The ellipsoid backprojections differ in length or area (309,310) depending on the sample number and the position of the foci (312,313,314). The echo samples can be weighted to take into account the total surface area of the backprojected ellipsoid.

Recording the Echo Histories in Recording Devices

Refer to FIG. 15

A recording device (264) may be added which, when connected (263), can record a sequence of echoes from the time history memories (265) of each of the receiver elements (261, 262). The recorded echoes may later be played back into the time history memories for reconstruction of the image (266) by the rest of the imaging machine.

Axicon Array with Reduced Sidelobe Levels

Figure 20:
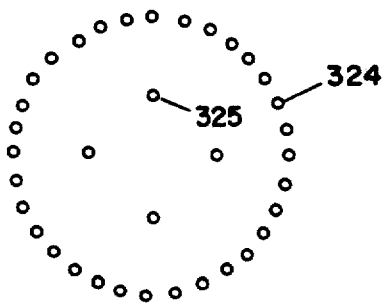
FIG. 20 shows an axicon array.

Refer to FIG. 20

If more elements are added to a sparse circular array (324), the array will become a phased annulus or axicon with receiver elements closely spaced around a circle. This type of aperture does not have grating lobe problems, but has very high sidelobe levels when used with oscillating transmitted pulses. If non oscillating noninterfering or low interference pulses are used the sidelobe levels are reduced. If, in addition, multiple transmitters (325) and multiple redundant pulses are used, the sidelobes are further reduced, and interfering type pulses may yield adequate images.

Oscillation Compensation

Refer to FIG. 18

A non oscillating transmitted pulse may be hard to achieve in certain types of imaging systems. Also, if a non oscillating pulse is transmitted (267), propagation effects (268) may cause oscillations to build up (269). This may be compensated for by detecting or rectifying (271) the echo (270) and then filtering it (272) to generate corrected pulses (273) which are then used for image reconstruction.

Alternately, a time varying filter (for example, a time varying matched filter) may be used where the filter coefficients are made a function of the sample number or time of flight to account for differing propagation effects depending on the round trip time of flight of the echo. The echoes (275) are digitized (274) and fed into a sequence of latches (276,277,278,279,280). The latch outputs (291,289,287,285,283,281) are multiplied (292,290,288,286,284) by the filter coefficients which are stored in a PROM (293). The prom address (294) is sequenced as a function of time of flight. The multiplication results are summed (295,296,297,298,299) and the result is a corrected pulse which is then used for image reconstruction.

Background Level Reduction

Refer to FIG. 19

A shadowgram is created by integrating along viewing vectors (316) through a reconstructed three dimensional volume. When this is done the sidelobe levels (322) are summed which obscures the resulting shadowgram. The sidelobe levels create a relatively constant ambient level in the reconstructed three dimensional image. If this level is subtracted out before the shadowgram is created, the sidelobes will not be integrated into the resulting image.

Time History Filtering

Figure 25:
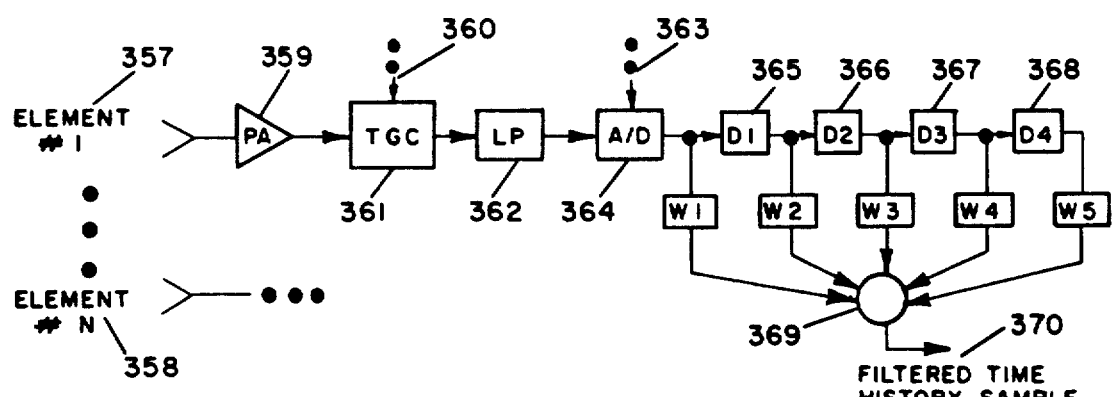
FIG. 25 shows time history filtering.

Refer to FIG. 25

Filtering the echo samples stored in the time history memories, before backprojection, can have beneficial effects on the reconstructed image.

In general the filters can reduce image clutter artifact, reduce peak sidelobe levels, reduce average sidelobe levels and increase resolution (sharpen the point spread function).

FIG. 25 shows as an example a four stage non recursive filter. Recursive filters may also be implemented. FIG. 25-357,358 represent the input signals from the receiver elements. These signals are processed through preamps (359) and time of flight gain compensation amplifiers (360) which are controlled by a signal (361) which increases the gain as a function of time to balance out time varying attenuation. The low pass filter (362) restricts the noise bandwidth and prevents aliasing. The analog to digital converter (364) digitizes the signal in synchronism with the sample clock (363). Four latch stages (365,366,367,368) of the digital filter hold successive echo samples. Each of the samples is multiplied by a weight, w1, w2, w3, w4. The weighted samples are then summed (369) together to form the filtered sample (370).

The value of the weights, w1, w2, w3, w4 determine the type of filter applied and can be under machine control and also varied dynamically, for example, as a function of reconstruction point position, as a function of round trip time of flight or they may may also be adjusted manually by the operator.

Examples of filters that can have beneficial effect are: a two stage backdifferencing filter, a three stage approximation to the sine function, a matched filter for slightly oscillating transmit pulses, a time varying filter to compensate for transmission effects.

Recon Address Generation for Multiple Transmitters

Refer to FIG. 28

FIG. 28-388 are the reconstruction point coordinates whereas the following ROMs and latches are used to find the distances, RPTj, from the reconstruction point to the different transmitters. These distances are combined with the distances from the reconstruction point to the receiver elements RPEj. When that total round trip distance is divided by the velocity of propagation and then divided by the echo sample interval, the time history memory addresses are formed for the proper selection of echo samples to be combined to create a reconstructed image point.

The first set of ROMs (386,390,395) find the distances as projected in the XY plane. The second set of ROMs (393,394) take that intermediate distance along with the Z coordinate and find the final distance RPTj (391,392).

Arbitrary Three Dimensional Array

Refer to FIG. 30

A three dimensional array may be used which is composed of a number of transmitters and receivers arranged in arbitrary positions in three dimensional space. Each transmitter/receiver pair will contribute a family of ellipsoidal projections through the imaged three dimensional volume. These projections are backprojected to reconstruct the image.

In FIG. 30 an arbitrary three dimensional array is shown where 400,401,402,403 and 404 are receiver elements and 405 and 406 are transmitter elements.

Non Interfering and Low Interference Pulses

Refer to FIGS. 31,36 and 37

"Non interfering" and "low interference" pulses have very useful characteristics for ellipsoidal backprojection imaging. The exhibit no or little destructive interference effects and, therefore, have reduced grating lobes and cause minimal specular reflection.

Examples of non interfering pulses are monopolar or unipolar (a synonym) pulses as described in U.S. Pat. Nos. 4,706,499 and 4,688,430. This type of pulse comprises: gaussian pulses, square pulses, triangular pulses and impulsive type transmissions. FIG. 36-446 shows a monopolar (or unipolar) gaussian pulse. FIG. 36-447 shows a monopolar square wave. FIG. 36-448 shows a monopolar triangle pulse. FIG. 36-449 shows an approximation to an impulse. Low interference type pulses include noise like transmissions, single cycle pulses (as described in U.S. Pat. Nos. 4,706,499 and 4,688,430), and short pseudo random time sequences with low interference properties. Referring to FIG. 31, a wideband random pulse may be generated by the transmitter for single pulse imaging purposes. The resulting echoes can be processed in the same manner as those resulting from a monopolar pulse transmission. This sort of pulse may be easier to generate in some applications although it has some disadvantages. Since it will typically contain periodic interfering components some interference phenomena will occur causing a degree of specular reflection. If the specular reflection phenomena is not too severe, adequate images will result. Also since there are components with alternating polarity some beamforming will occur upon transmission. However, depending on the nature of the pulse, the beam may be smeared, without sharp, strongly formed lobes, and also broad allowing adequately uniform illumination of a wide solid angle. A pulse possessing these qualities of weak beamforming and weak specular reflection will be considered "low interference" or relatively non interfering for purposes of this application and will be considered capable of radiating or propagating uniformly through a wide solid angle in this application. The low interference pulse type classification includes all non interfering pulse types in addition to the foregoing described pulse types. FIG. 31-407 shows a random wideband pulse launched from a transmitter (408).

Other types of pulses may also have desirable characteristics for use in Ellipsoidal Backprojection imaging systems and may be considered low interference types. Specifically, these characteristics are: ability to propagate adequately uniformly through a wide solid angle (without large peaks and nulls in intensity, in the illuminated field of objects, so great as to render inadequate images); short temporal duration as required for adequate resolution (although compression techniques may be used to synthesize this); and weak specular reflection formation (as with relatively non interfering pulses).

One criterion that can be used to judge the degree of non interference is the autocorrelation function of the transmitted pulse waveform. Autocorrelation measures, as a function of shift, the integral of the product of a waveform and a shifted replica of the waveform.

A better criteria would be a measure, as a function of shift, of the integral of the sum of a waveform and a time shifted replica of the waveform, the resulting function being termed an auto interference function.

A relatively non interfering pulse, or low interference pulse would have a peak, for shift equal to zero, in both of these measures. The remaining portion of the measures, for non zero values of shift, would be lower in value and without large oscillation in amplitude.

Transmitted pulses satisfying these criteria would generally meet the requirements for: uniform propagation through a wide solid angle; and weak specular reflection formation. These pulse types could be classified low interference. Low interference type pulses are shown in FIG. 37. FIG. 37-450 shows a noise like pulse of short duration. FIG. 37-451 shows a single cycle sinusoidal pulse. FIG. 37-452 shows a single cycle square wave. FIG. 37-453 shows a short train of pulse width modulated pulses. FIG. 37-454 shows a quickly damped sinusoidal pulse. FIG. 37-455 shows a pulse approximating an impulsive doublet. FIG. 37-456 shows a single cycle triangle pulse.

Short Duration Interfering Pulses, Oscillating Transmit Pulses and Other Interfering Type Pulses

Refer to FIGS. 33, 34, 35 and 38

Interfering type pules have pulse shapes which can cause strong destructive interference effects as in beam forming or in specular reflection. Temporally limited interfering pulses can be, additionally, adequately limited in spatial or temporal duration so as to allow usable range resolution and lateral resolution. Range resolution is in the direction of propagation of the transmitted pulse. Lateral resolution is in all other directions. Referring to FIGS. 18, 19, 34,40,41, and 42, it can be seen as the transmit pulse is lengthened, both lateral and range resolution will be degraded. Adequately limited pulses, providing acceptable range and lateral resolution, will be termed "short duration interfering pulses". More generally, the term "short duration pulses" will include interfering, low interference and non interfering pulses short enough for adequate range and lateral resolution.

An oscillating transmit pulse, of the short duration interfering type, may be used in ellipsoidal backprojection imaging. The oscillations will cause an amplitude modulation of the backprojected ellipsoids if the transmitter is large enough to cause beam forming effects, however, if only the three dimensional volume spanned by the central area of the ellipsoids is of interest, the modulation will not create a problem. Alternately, if the transmitter is small compared to the wavelength, the main lobe will be very wide and the ellipsoids will not be modulated significantly in the imaged volume.

When an oscillating pulse propagates through a wide solid angle, specular reflection problems may occur. However, if the wavelength is longer than the largest expected specular surfaces, then sufficient echo energy will propagate back toward the receiver array for adequate imaging. Alternately, if the surface irregularities are of the order of the wavelength, the energy will be incoherently scattered, and specular reflection will not be a problem. Also in some imaging systems, specular reflection may be tolerated and interfering type pulses may yield useful imaging information. In any of these systems, the echo samples resulting from an interfering type pulse can be processed, and the image reconstructed, in the same manner as echoes resulting from non interfering type pulses.

FIG. 33-423 shows a transmit/receive array. Four receiver elements (421) surround a single transmitter (422) in this example. An oscillating transmitted pulse (a short duration interfering type pulse) propagates outward through a wide solid angle (426). The three dimensional volume contained within the wide solid angle is illuminated relatively uniformly by the main lobe (424) of the beam pattern formed by the transmitted pulse.

FIG. 34 shows the backprojected ellipsoids that have been modulated by the beam pattern of the transmitted pulse. The transmitter (435) and the receivers (434,436) form the foci of the two backprojected ellipsoids. Portions (430,431) of the ellipsoids lie within the mainlobe area (427) of the transmitted pulse. The reconstruction point (445) is just within the mainlobe area (429)1. Points further off axis will not be reconstructed properly and will be within the transmit pulse sidelobe region (432,433).

FIG. 35 shows a relatively long wavelength (438) pulse (439) propagating away from a transmitter (441) surrounded by receiver elements (440). It propagates through a wide solid angle (437). A specular reflector (442) is in the path of the transmitted pulse, however, the energy reflected is only weakly focused (443) in a direction away from the receiver array. A reflected sidelobe (444) also is formed. The receiver will detect reflected energy from both the reflected mainlobe (443) and the reflected sidelobe (444) and adequate imaging is possible.

FIG. 38 shows various types of short duration interfering pulses. FIG. 38-457 shows a finite duration sine wave type pulse. FIG. 38-458 shows a short duration square wave. FIG. 38-459 shows a slowly damped sine wave of short duration.

The autointerference function has been described with suggested use as a measure of a pulse's interference properties. FIG. 39 shows the autointerference function for a short duration sine wave. FIG. 39-465 shows the bounds of the integration, which is the original length of the pulse. FIG. 39-463 & 464 show the shift variable. FIG. 39-460 is the original pulse. FIG.-461 & 462 are shifted replicas of the original pulse. FIG. 39-467 shows the resulting autointerference function as a function of the shift variable (466). For a particular value of the shift variable, the replica is shifted by that value. Then, the replica and the original are added together, point by corresponding point, for each position and its corresponding points in the original and replica on the horizontal axis. The resulting added points are then summed together over the integration interval yielding a single numerical value associated with the particular value of the shift variable. This is repeated for each value of the shift variable. The resulting numerical sequence, as a function of the shift variable, is the autointerference function. It can be seen that the illustrated autointerference function has many peaks and nulls suggesting relatively strong interference.

FIG. 40 shows backprojection of echo samples resulting from a short duration sine wave (473, 484) which is contained in the backprojected ellipsoidal shells (466, 472). A minimal geometry is shown to facilitate understanding. Referring to this figure, 470 shows the single transmitter, 469 & 471 the two receiver elements, 473 & 484 show the shape of the original transmitted pulse and also the shape of the shell (472 & 466) of the backprojected ellipsoids. 480, 482, 483 are the loci of the maxima in the backprojected echoes. 478 is the reconstruction point. In this simple illustration, only two echo samples are backprojected to reconstruct the point. 474, 475, 476, 477, 478, 479, 486, 486 are the locations where the maxima of the backprojected echoes intersect, and are analogous to grating lobes. With only two backprojected echoes, the grating lobes are equal in amplitude to the reconstruction point. Two maxima contribute to each grating lobe and also to the reconstruction point.

FIG. 41 shows the case where four echo samples are backprojected to reconstruct a point. Referring to this figure, 486 is the reconstruction point. 486, 487, 488, 489 are the loci of the first maxima of the four backprojected echoes. 490, 491, 492, 493 are the shape of the transmit pulse. 496 is the transmitter. 494, 495, 497, 498 are the receiver elements.

FIG. 42 shows a detail of FIG. 41, the backprojections on the right side of the reconstruction point. Referring to this figure, 501 is the reconstruction point. 505 is the transmit pulse shape. 516, 513, 511, 506 are the centers of the backprojected echoes. 517, 515, 514, 512, 510, 509, 507, 508 are the loci of the maxima. With more than two backprojected echoes, it can be seen that most often no more than two maxima intersect (504, 502, 503), except at the reconstruction point, where, in this case, all the maxima intersect. These are the grating lobes. There may be some "higher order" grating lobes (500, 499) where more than two maxima intersect, however, with proper receiver element spacing, this can be minimized. So then, even with interfering type pulses, grating lobes can be suppressed. Then, although interfering type pulses are not the optimum type, they may be used in three dimensional imaging when ellipsoidal backprojection image reconstruction is used.

Ellipsoid Eccentricity and Element Separation

Refer to FIG. 43

The eccentricity of the backprojected ellipsoids (521, 522, 523), for a given reconstruction point distance from the focal axis (518, 519, 520) is a function of the distance between the foci, the transmitter (524, 525, 528) and the receiver (526, 527, 528). If they coincide (528), the ellipsoid becomes a sphere.

Imaging with Closely Spaced, Non Sparse Arrays

Refer to FIG. 44

Although sparse arrays may be used in ellipsoidal backprojection imaging, they are not required. Some imaging applications may require small apertures for access or because of space limitations. However, they may also require numerous backprojected ellipsoids so as to achieve low sidelobe levels. This requires that a large number of transmitter and receiver elements be placed in the small aperture resulting in a non sparse or closely spaced array (529). The spacing between the elements (531, 532) may be only a small fraction of the spatial length of the transmitted pulse (530).

Nonlinear Processing

Refer to FIG. 32

The echo samples must be "combined" to reconstruct an image.

The term "combining" comprises both linear combination (typically addition or summation) and nonlinear combination (for example, multiplying the echo samples together).

Nonlinear processing may be implemented in the reconstruction process to increase the resolution and control the sidelobes. In a system using many diverse backprojected ellipsoids, a weak form of nonlinear processing may be implemented that does not cause the undesirable effects normally associated with nonlinear imaging techniques such as strong response in sidelobes for certain imaging conditions. Nonlinear processing may be especially appropriate when only a few sparsely spaced objects are to be imaged as in sonar applications.

One method of nonlinear processing could be termed root processing and is shown in FIG. 32. The echo samples (417) are selected from the time history memories (409,410,411,412) as previously described. As an example, four time history memories are shown. The echo samples are used as addresses to the root mapping ROMs (413,414,415,416). The ROM outputs are the Ath root of the echo samples. The processed samples are then summed, as previously described, in the echo combiner (418). The result is then used as an address to a power mapper ROM (419). The output of the ROM is the Ath power of the input and is also the reconstructed image point (420).

The strength of the nonlinear processing can be controlled by modifying the value of A.

Alternate Methods of Echo Sample Combination

Refer to FIG. 45

The term "combining" comprises all methods of echo combination including combining sequences of samples, rather than individual single samples, as in cross correlation combination. Other forms of combination using nonlinear processing would include multiplicative processing (where echo samples are combined by multiplication), or log processing (where the logarithms of echo samples are taken before summation), and logical processing where echo samples are converted to binary values, one or zero, by a multiplication, or a combination of addition and multiplication, with the results of the combination then possibly being converted back to a digital value. This is essentially binary combination using logic elements (and gates or or gates), "logical combination". The echo samples could also be combined by correlation or cross correlation.

Referring to FIG. 45, 533 shows multiplicative combination. 538, 539, 540, 541 are the echo sample inputs. 535, 536, 537 are multipliers which multiply the echo samples together to produce the reconstructed point (534).

570 shows a particular type of logical combination where the echo samples (543, 545) are first compared to a threshold, reference value (544, 546) by comparators (542, 547). The resulting binary values are fed to an and gate (548) which creates the reconstructed point (549). More complex logic can be used, for example, to require only a minimum number of successful comparisons to provide a unity reconstruction point.

535 shows a cross correlator for echo sample combination. Echo sample (550, 557) time sequences (558) are shifted into latches (551, 552, 553, 554, 555). The sequences are then multiplied together (556, 559, 560, 561, 562) and the results (567, 563, 564, 565, 566) summed together (566) to produce the reconstructed point (569).

Filtered Ellipsoidal Backprojection using a Hilbert Filter

Refer to FIGS. 46 and 47

Filtering the echo samples stored in the time history memories, before backprojection, can have several beneficial effects on the reconstructed image. The filter can cause positive and negative oscillations in the point response sidelobe areas which tend to cancel from one backprojected ellipsoid to the next. This tends to reduce the sidelobe levels. The filter can also cause a sharpening in the main lobe of the point response for the same reasons.

In general the filters can reduce image clutter artifact and increase resolution.

FIG. 47 shows as an example a five stage non recursive filter. Recursive filters may also be implemented. FIG. 47-1 represent the processed input signals from the receiver elements. These signals are processed, as described previously, through preamps and time of flight gain compensation amplifiers which are controlled by a signal which increases the gain as a function of time to balance out time varying attenuation. A low pass filter restricts the noise bandwidth and prevents aliasing. An analog to digital converter digitizes the signal in synchronism with the sample clock.

Four latch stages (FIG. 47-2) of the digital filter hold successive echo samples. Each of the samples is multiplied by a weight {c1, c2, c3, c4, c5} (FIG. 47-28,29,30,31,32). The weighted samples (FIG. 47-17,18,19,20,21) are then combined (FIG. 47-7) together to from the filtered sample (FIG. 47-9). The samples weighted by c1,c2, c4,c5 are subtracted from the central sample weighted by c3. The sum of the weighting coefficients is zero (FIG. 46-9,15,28) if the filter is a Hilbert filter.

In general, digital filter theory is well known and can be found in Digital Filters-Hamming, Digital Signal Processing-Oppenheim & Schafer, and other common sources.

Simple filters may be implemented where multiplication is replaced by a shift of bits if the coefficients are in powers of two. FIG. 47-10 are the input echo samples which are delayed by latches (FIG. 47-11). The input (FIG. 47-16) and output (FIG. 47-14) are shifted right before being subtracted in adders (FIG. 47-12) from the central sample (FIG. 47-15). The results (FIG. 47-13) are the filtered echo samples. Since this filter has coefficients {−5,1,−5}, it is a digital approximation to the second derivative and will be called, for the purpose of this application, a digital second derivative filter.

Filters of types other than a Hilbert filter may be implemented. The value of the weights, c1, c2, c3, c4 determine the type of filter applied and can be under machine control and also varied dynamically, for example, as a function of reconstruction point position.

Examples of filters, in general, than can have beneficial effect are: a two stage backdifferencing filter, a three stage approximation to the sine function, a matched filter for slightly oscillating transmit pulses.

The Hilbert filter, refer to FIG. 47, as defined for this patent application, is a filter with all negative weights (or coefficients) (FIG. 46-3,4,5,6,7,8, FIG. 46-10,11,13,14, FIG. 46-16,17,18,19,20,24,25,26,27,28) except for the central coefficient or coefficients (FIG. 48-2,FIG. 2-12,FIG. 46-21,22,23) which is or are positive. In addition the sum of the negative coefficients is equal (or approximately equal) to one, so that, the sum of all the coefficients is equal to (or approximately equal to) zero (FIG. 46-9,15,29). Of course, the coefficients may all be multiplied by minus one to invert the requirements on the signs of the coefficients.

FIG. 46 shows the filter coefficients 1,2,3,4,5,6,7,8,10,11,12,13,14,16,17,18,19,20,21,22,23,24,25,26,27,28) superimposed on the impulse response (1,30,31) of three types of Hilbert filters.

It can be seen that the integral of (area under) each impulse response is approximately zero. This corresponds to the sum of the filter coefficients being zero. Either of these two conditions cause the DC or zero frequency component of the filters impulse response to be zero. These conditions, alone, do not cause the filter to be a Hilbert filter.

However, these conditions combined with the further condition that the filter coefficients (or their equivalent for a recursive digital filter or an analog filter) be negative everywhere except in or near the center of the impulse response (FIG. 46), define a Hilbert filter.

Inverse Triplet Filtered Ellipsoidal Backprojection

The optimum filtered or processed echo time history due to a single reflecting point is a triplet (FIG. 48-1,2,3,4). According to experiments, after ellipsoidal backprojection, this type of processed echo data will yield the best image. A triplet is characterized by having three parts, the central positive part (FIG. 48-13,14,15,16) and two negative parts (FIG. 48-5,6,7,8,9,10,11,12). Further, the sum of the areas under the negative parts equals the area under the positive part as in the impulse response of the Hilbert filter. The triplet has a zero or near zero DC component when Fourier analyzed.

Any type of echo may be processed into filtered echo data which will approximate this type of response; this includes monopolar pulses, bipolar pulses, pulses consisting of a few damped cycles of a sinusoid, noise bursts, Walsh code sequences and other coded sequences, and frequency chirps, frequency ramps or frequency sweeps. For code sequences or chirps, the normal pulse compression filter can be combined with the Hilbert filter to yield the desired triplet-type pulse.

This type of filter will be termed an "inverse triplet filter" for purposes of this patent application. The filtering process will be termed "inverse triplet filtering" and the processed data will be termed to be "inverse triplet filtered".

One implementation of this type of processing is shown in FIG. 49. The first block (FIG. 49-2) is a conventional matched filter. The second block (FIG. 49-3) is a Hilbert filter. The combination (termed an inverse triplet filter) results in the conversion of the echo data (FIG. 49-1) into triplet type echo data (FIG. 49-4).

Figure 2:
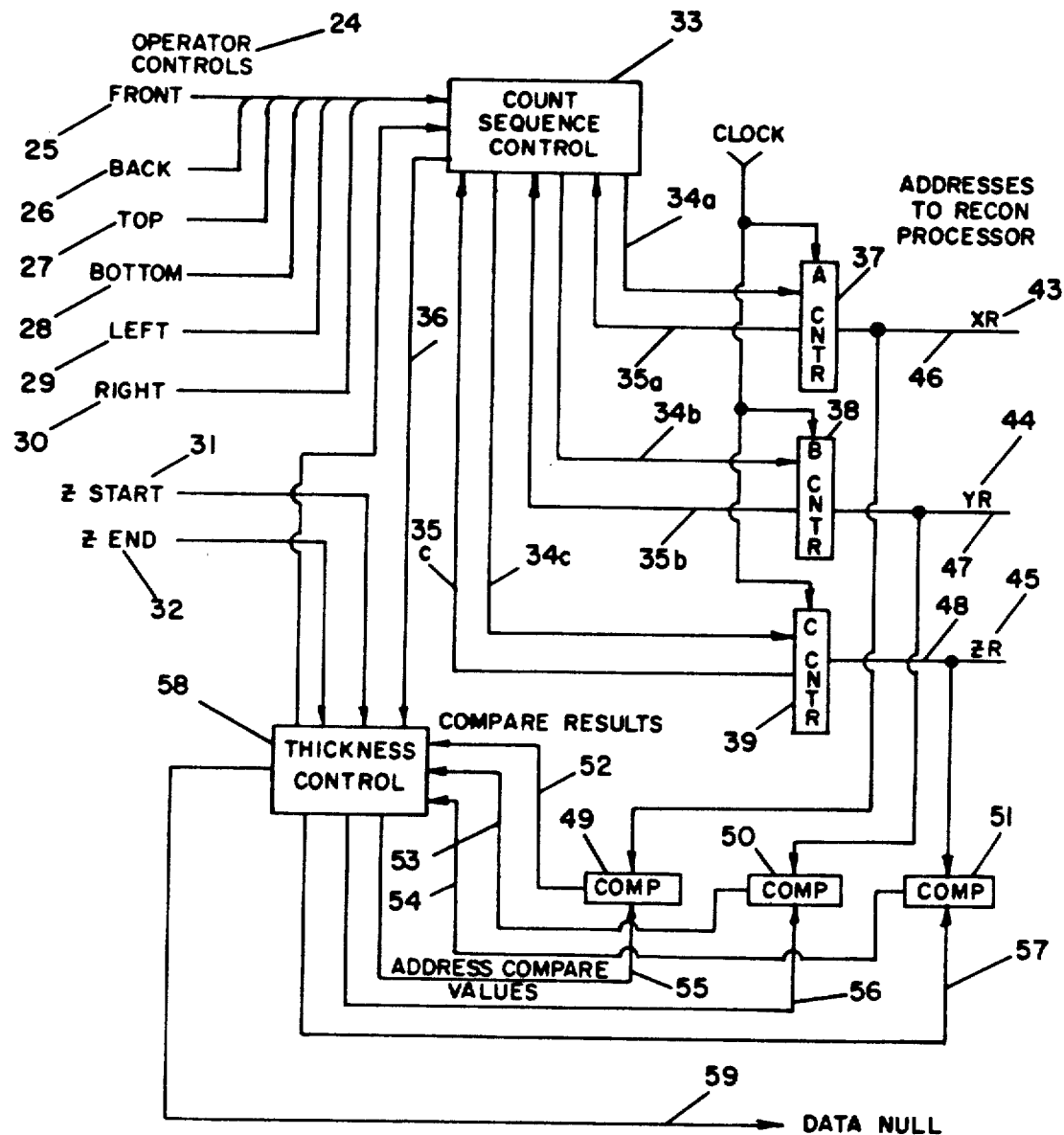
FIG. 2 shows a block diagram of the perspective processor which controls the reconstruction sequence to generate three dimensional or tomographic views from user selectable perspectives.

As is well known, a matched filter has as its impulse response a time reflected copy (FIG. 50-3,4) of the signal to be filtered (FIG. 50-1,2). This is shown in FIG. 50. The filter can be implemented as an FIR convolution filter in the echo data path as was described in the discussion of the Hilbert filter.

The matched filter is followed by a Hilbert filter which has been described in detail previously. The two filters can be combined by combining their coefficients, as is well known and described in texts on digital filtering.

The Hilbert filter portion may sometimes not be required. Note that if the original echo data, as received, consisted of an impulse, the inverse triplet filter would be identical to the Hilbert filter.

If the origional echo data consisted of a doublet, the inverse triplet filter would be a differentiator.

Sometimes no actual filter is required; the returned echo may already be in the required form: already filtered. For purposes of this application this type of echo data will be considered to be filtered. If the origional echo data, as received, consisted of a triplet, the inverse triplet filter would be the "unit" filter, that is, no filter at all.

To further illustrate, this type of processing works with chirped transmitted pulses (eg. "Modern Radar" R. Berkowitz, John Wiley, 1966): After reception and pulse compression, the echo data would be processed through the inverse triplet filter before ellipsoidal backprojection.

Again, whatever the form of the echo from the single reflecting point, the function of the inverse triplet filter is to linearly process that echo into the form of a triplet.

For further examples, if the echo received from a reflecting point was a Gaussian pulse, twice differentiating the received echoes would essentially implement the inverse triplet filter. If the echo received from a reflecting point was a single sinusoidal cycle, convolution of the received echoes with a similar but time reversed single sinusoidal cycle would essentially implement the inverse triplet filter. If the echo received from a reflecting point was a Walsh sequence (eg. Chen and Hsiao, "Time Domain Synthesis via Walsh Functions", Proc. Ist. Elect. Eng., 1975, 122), convolution of the received echoes with a similar Walsh sequence, followed by a low pass filter, then by two differentiators, would essentially implement the inverse triplet filter.

The theory behind the filter is as follows: Given the location of a receiver E and transmitter T, and assuming the signal $s(E,T,t)$ received at a point receiver due to a single reflecting point is of the form $f(t)$, an FIR convolution filter with a window function $F(t)$ can be used on the echo time history data before backprojection proceeds. The ideal window function is $F(t) = f''(t)^{*-1}$, where $f''(t)^{*-1}$ is the second derivative of the convolution inverse of $f(t)$ (eg. "Distribution Theory and Transform Analysis", Zemanian, Dover 1965, p. 150). The convolution inverse is defined by $f(t)*(f(t)^{*-1}) = \delta(t)$, where $\delta(t)$ is the Dirac delta function (or "distribution or generalized function", eg. see "Generalized Functions", Gelfand, vols. 1-5, Academic Press). Then $f''(t)^{*-1} = D_{tt}f(t)^{*-1}$, where $D_{tt}$ denotes the second derivative with respect to time; and so $f(t)*f''(t)^{*-1} = f(t)*D_{tt}f(t)^{*-1} = \delta''(t) = D_{tt}\delta(t)$. Obviously $f''(t)^{*-1}$ cannot be exactly implemented, so the good approximation will suffice in practice with the goal being to produce a filtered echo from a reflecting point which approximates $\delta''(t)$.

The filter can also be implemented in the frequency domain as is commonly done in digital signal processing: First the Fourier transform of each echo time history $s(E,T,t)$ is taken with respect to the time variable t giving ^s(E,T,t). Then the Fourier transform of F(t) is taken giving ^F(t); this can be done by first Fourier transforming f(t)*$^{-1}$ yielding ^f(t)*$^{-1}$ and the multiplying by 1/Ω² to yield (1/Ω²(^f(t)*$^{-1}$)= ^F(t). The two Fourier transforms are then multiplied together for each echo time history yielding ^s(E,T,t)( ^F(t)), and the results are inverse Fourier transformed yielding s(E,T,t)*F(t). This will then be the filtered data which will be backprojected over ellipsoids during image reconstruction. (eg. for a discussion of this method: "Digital Filters", Hamming, Prentice Hall, 1977; or "The Fast Fourier Transform", Brigham, Prentice Hall, 1974).

The convolution inverse of f(t) can also be found by use of the Fourier transform: First the Fourier transform of f(t) is taken yielding ^f(t). Next 1/( ^f(t)) is computed and then is inverse Fourier transformed (frequencies where it becomes too larger will have to be truncated and smooth first). This yields an approximation to f(t)*$^{-1}$ (eg. see the mentioned references).

The Use of Large Spherically Curved Transmitters in General

Figure 21:
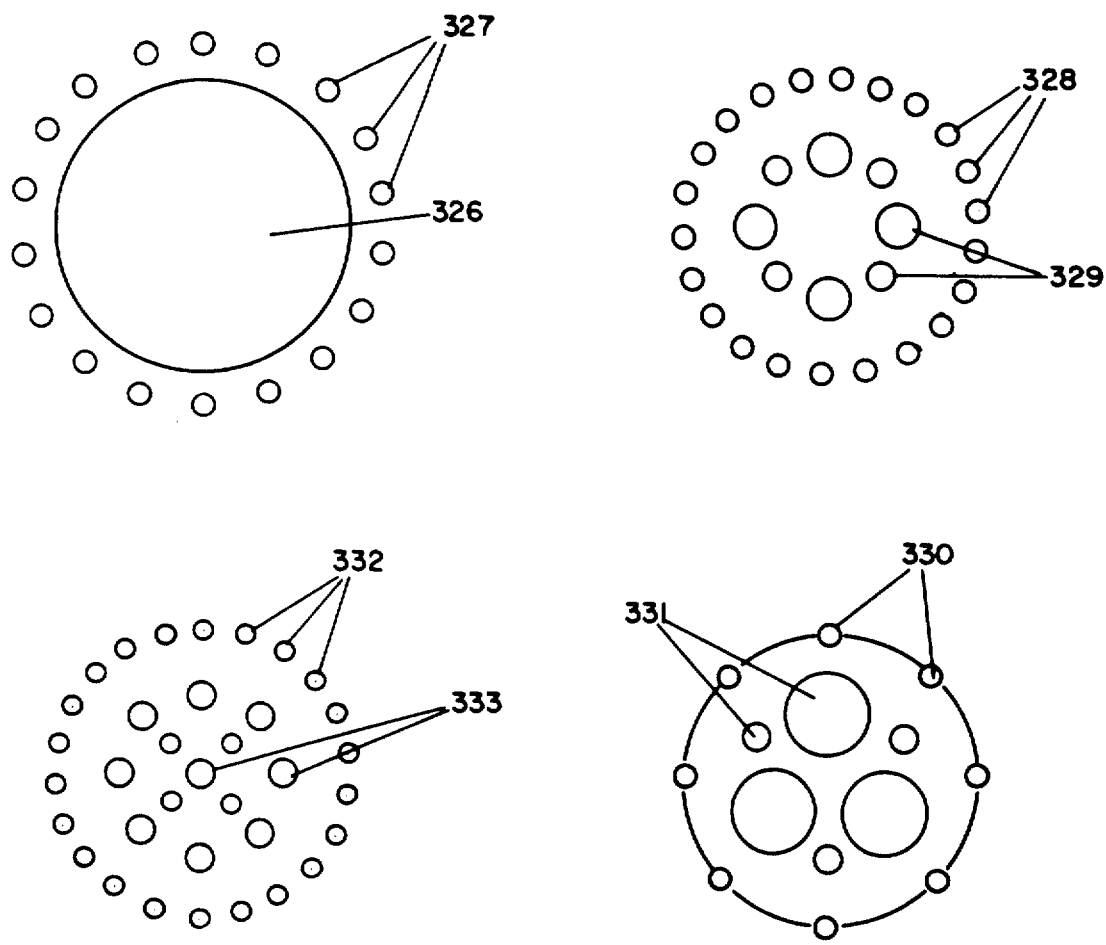
FIG. 21 shows arrays using multiple large curved transmitters.

Signal to noise ratio can be increased by the use of large, rather than small point-like, transmitters. Referring to FIG. 21, a circular array of receiver (327) can be placed around a large spherically curved transmitter (326). Receivers (332) can be placed around a group of spherically curved transmitters (333). Receivers (328, 330) can be placed around a group of spherically curved transmitters of different size and spherical curvature (329, 331).

Small transmitters emit waves that have amplitudes which fall off in proportion to the reciprocal of the distance traveled. This amplitude loss can be reduced and compensated for by the use of large transmitters which consist of a spherically curved surface. The ellipsoidal backprojection algorithm can be modified in a simple manner to take these large transmitters into account: The round trip travel distance from transmitter to image reconstruction point thence to receiver, RPT+RPE (see FIG. 3-60a and 60b; FIG. 4-80, 82 and 88; FIG. 5-89,90,91,92,94) is normally used in selecting echo samples to be summed. In the algorithm for large spherically curved transmitters, the center of curvature (FIG. 22a-347) is used in computing the distance PRT, rather than the actual location of the transmitter's surface (22a-344). RPT, the distance from the reconstruction point to the transmitters, (or RPT+RPE, the round trip distance) is then modified by subtracting r (22a-343), the radius of curvature of the transmitter. The resulting modified round trip travel distance, RTP+RPE, is the used in the normal manner to select echo samples to be summed for reconstruction of the image.

The foregoing discussion applies correctly also to small point like transmitters or transmitters whose physical extension and radius of curvature can be neglected. As r tends to zero, the center of curvature becomes simply the location of the transmitter and zero is subtracted rom RPT+RPE, thus giving the previously discussed image reconstruction algorithm for non extended transmitters.

The Use of Single Large Transmitter

Figure 22A:
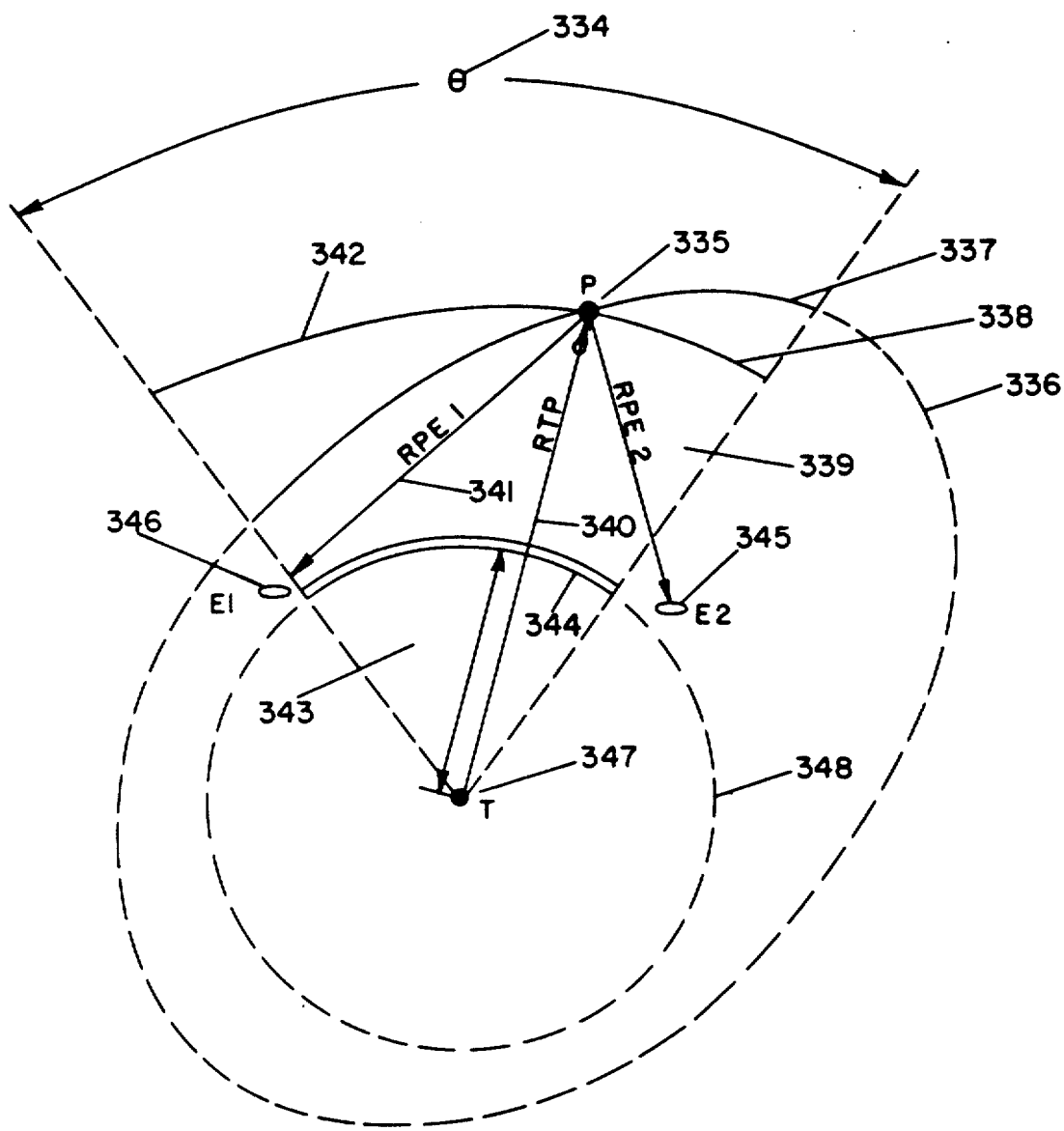
FIGS. 22a, 22b show an array using a single large curved transmitter.
Figure 22B:
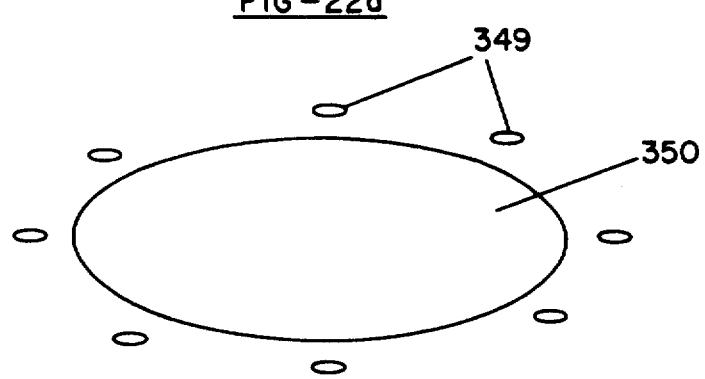

Referring to FIGS. 22a and 22b, a single large transmitter (22a-344; 22b-350) consisting of a portion of a sphere may be used instead of a small transmitter. The solid angle (22a-334) subtended by the cone (with vertex at the sphere's center (22a-347) which defines the portion of the sphere (22a-348) which is the transmitter (22a-344; 22b-350) contains the direct wave (22a-342) which is used to insonify the volume to be imaged. Edge waves will propagate from the edges of the truncated sphere; however they will only add a diffuse background level to the image.

FIG. 22a shows the spherically curved transmitter (344) which is a portion of the surface of a sphere (348) centered at T (347). T becomes a virtual point transmitter, and therefore it is one focus for the ellipsoid (336, 337), which has its other focus, the receiver E2 (345). Only one portion (337) of the ellipsoid is insonified by the wave (342) propagating thro the cone (334). The other portion (336) is drawn dashed to show that it is virtual, not insonified. P (335) is a reflecting point which is insonified at time (RPT−r)/c, where the transmitter (344) transmits a pulse at time zero. c is the propagation velocity, RPT (340) is the distance from the center (347) of the transducers (344) radius of curvature (343), and r (343) is the radius of curvature. Thus the geometry is identical to the one associated with a point-like transmitter located at T (347), only the pulse arrives at P (335) sooner by a factor of r/c; this is accounted for by subtracting r from the final computed round trip distance before its use in image reconstruction.

The echo is detected at receiver E2 at time (RPT−r+RPE2)/c. The echo is detected at receiver E1 (346) at time (RPT−r+RPE1)/c. RPE1 (341) is the distance from the reflecting point to receiver E1. So the echoes are portions of ellipsoidal projections of all reflecting points in space. FIG. 22b shows a large spherically curved transmitter (350) surrounded by receivers (349). Each receiver's echo time history consists of a sequence of portions of ellipsoidal projections.

Figure 26:
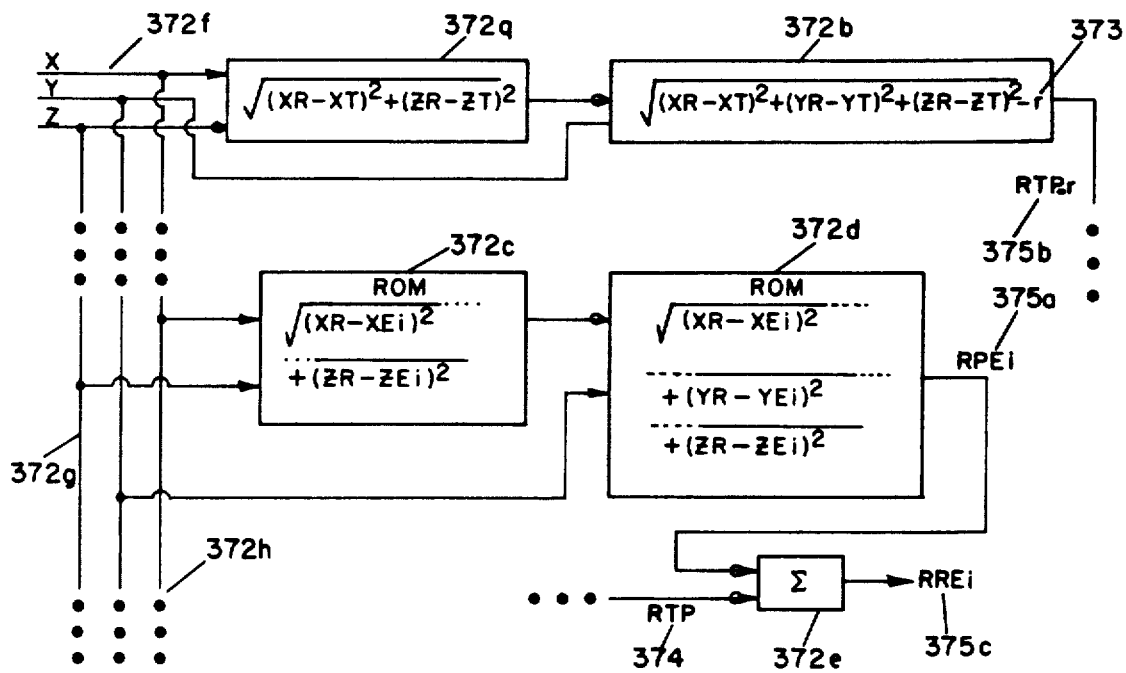
FIG. 26 shows reconstruction address generation for a single large curved transmitter.

FIG. 28 shows the modification required to the image reconstruction circuitry to accomodate a single large spherically curved transmitter. FIG. 4 shows the circuitry that needs to be modified. Only the lookup data contained in one ROM (71) needs to be changed. In FIG. 26, it can e seen that r (373) is subtracted from the results (372b) before RPT (375b) is in its final form. The circuitry in FIG. 26 operates similarly to the previously described circuitry of FIG. 4: The reconstruction point's coordinates (373f, 372g, 372h) are used as addresses for the first set of ROMs (372a, 372c) which compute a partial result which is used as part of the address to the second set of ROMs (372b, 372c). The upper set of ROMs (372a, 372b) compute the distance from the transmitter center of curvature to the image reconstruction point and subtract r (373) from the result. The second set of ROMs (372c, 372d), which show circuitry for a typical receiver Ei, compute the distance RPEi (375a) from the image reconstruction point to the receiver. The adder (372e) sums the results (374, 375c) from the two sets of ROMs to find the total round trip travel distance RREi (375c), which is appropriately scaled, then used as an echo time history address as in FIG. 5-101.

The Use of Multiple Extended Transmitters

Figure 24:
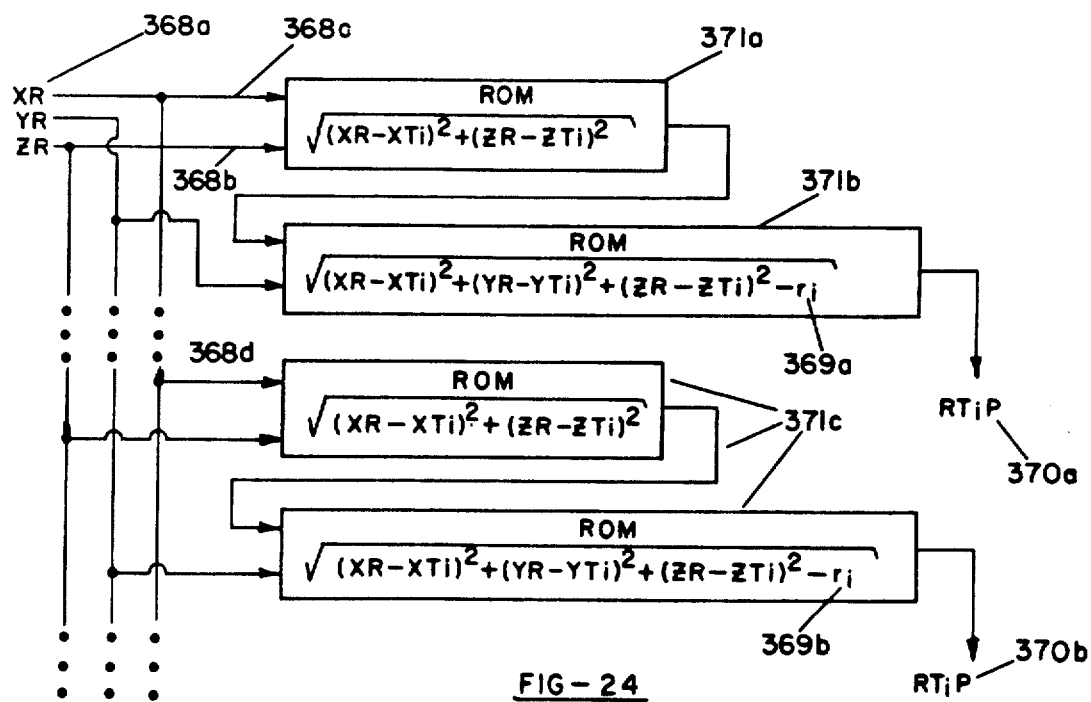
FIG. 24 shows reconstruction address generation for multiple large curved transmitters.

Referring to FIG. 24

Multiple extended transmitters are incorporated by repeating the circuitry which has been described for a single extended transmitter.

FIG. 28 shows image reconstruction echo sample address generation for multiple transmitters when the transmitters are small. For the required modifications to accomodate multiple extended transmitters: (XT1,YT1,ZT1) and (XTi,YTi,ZTi) in that drawing (393 and 392) would refer to the centers of curvature of transmitters T1 and Ti. The equation used to produce the output RPT1 (391) would be modified by subtracting r1, the radius of curvature of transmitter T1. The equation used to produce the output RPTi (392) would be modified by subtracting ri, the radius of curvature of transmitter Ti. This is repeated for each of the other multiple extended transmitters.

FIG. 24 shows the modifications to the ROMs and the equations used to generate the data for the look up tables programmed into the ROMs. The reconstruction point's coordinates (368a, 368e) are input as addresses (368c, 368b, 368d) to the ROMs (271a, 371b, 371c). The equations are the same as those used small transmitters except that the transmitter coordinates refer to centers of curvature. Also the radii of curvature (369a, 369b) are subtracted before the final results, PRT1 and RPTi (370a, 370b), are produced.

Paraboloidal Backprojection, Use of a large Planar Transmitter

FIG. 21-326 showed the use of a single large extended transmitter with radius of curvature equal to r and with center of curvature located at the point (XT, YT, ZT).

Figure 23:
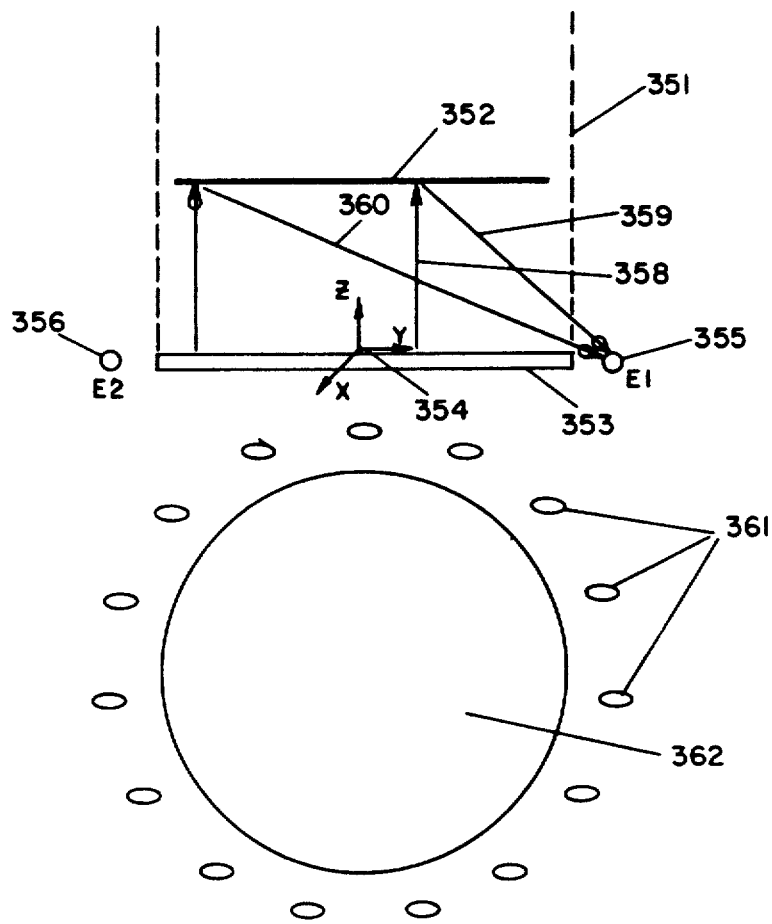
FIG. 23 shows an array using a single large flat transmitter.

FIG. 23 shows a similar geometry, but with the single extended transmitter (362, 353) being flat rather than curved with a finite radius of curvature (note that 'flat' is 'curved' with an infinite radius of curvature—the limiting case of the radius of curvature growing without bound). Receivers (356, 355, 361) are positioned around the transmitter. This can be accomplished by letting the radius of curvature in become infinite. In doing so the center of curvature recedes to infinity also, in the minus Z direction (354). As the radius of curvature becomes very large the ellipsoidal projections tend toward becoming parabolic projections. An echo sample recorded at time t after transmission represents the sum of the echoes from all reflecting points lying on a paraboloid. The paraboloid is formed by the direct planar wave (352) which propagates thro the cylindrical volume (351) defined by the face of the transmitter (353, 352). The time at which an echo from a reflecting point arrives at receiver E1 is determined by the points perpendicular distance from the transmitter (357, 358) added to the points distance from the receiver (359, 360). This is the round trip travel time.

Figure 51:
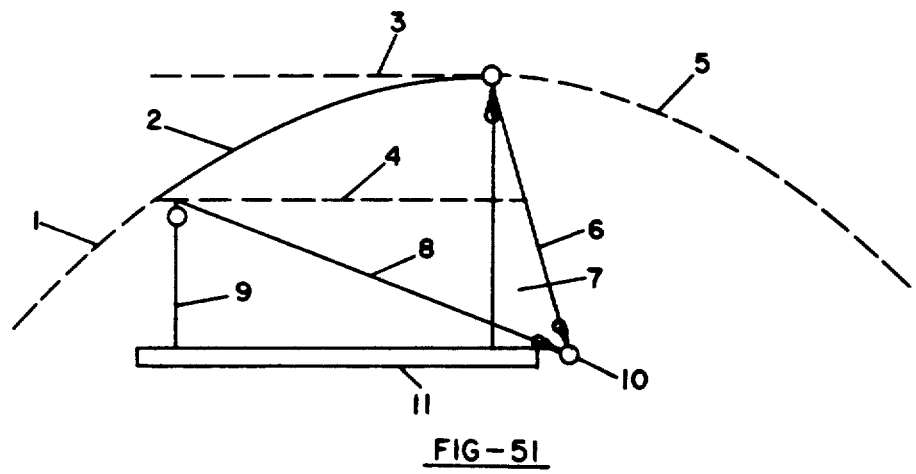
FIG. 51 shows parabolic projections.

FIG. 51 shows the geometry of a parabolic projection. (11) is the transmitter. (10) is the receiver. The dashed lines (3 and 4) represent the transmitted planar wave at two different points in time. The travel distance from the transmitter to two reflecting points are RPTi (9) and RPTi (7). The travel distances from the points to the receiver are RPEi (8) and RPEj (6). The round trip travel times RTPi+RPEI and RPTj+RPEj are equal. The same is true for every other point on the paraboloid (1, 2, 5). So the echo sample at time t=(RPTj+RPEi)/c=(RPTj+RPEj)/c is a paraboloidal projection of reflecting points intersected by the paraboloid (5). However only one section (2) of the paraboloid is illuminated by the direct wave. The echo samples collected at E1 (10) represent a sequence of portions of paraboloidal projections of the reflecting objects.

Figure 27:
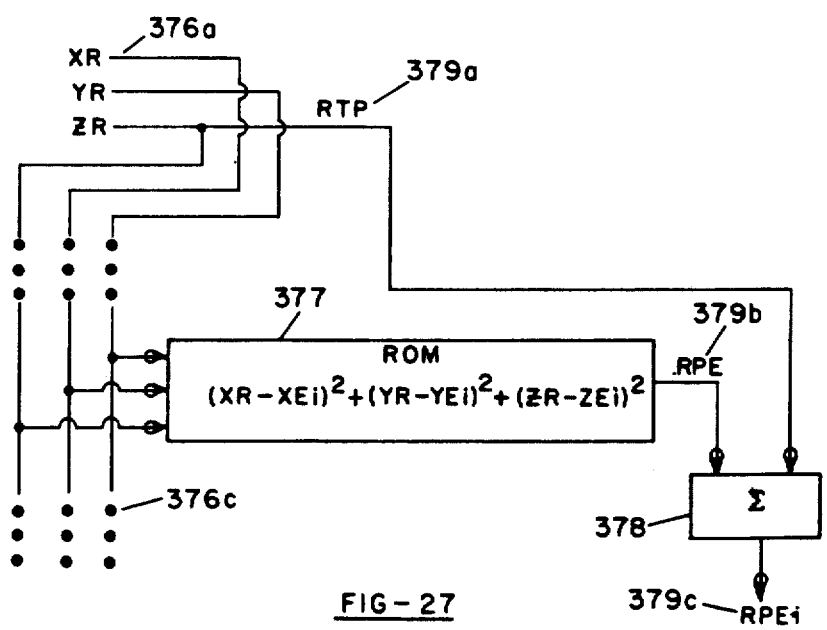
FIG. 27 shows reconstruction address generation for a single large curved transmitter.

FIG. 27 shows the modification the the image reconstruction processor circuitry to accomodate a single large flat transmitter. Here it can be seen that the ROMs (for example: FIG. 26-372a, 372b, 372c, 372d or FIG. 24-371a, 371b, 371c) can be completely eliminated. The Z coordinate of the image reconstruction point, ZR (376a), relative to a coordinate system (FIG. 23-354) centered at the transmitter (FIG. 23-353) becomes RPT (379a), the distance from the transmitter to the image reconstruction point. Since the round trip distance RREi=RPT+RPEi (379c) provides the echo sample addresses needed for image reconstruction, all that is needed is computation of RPE (379b) in the normal way by ROM lookup table using the normal equations (377) using the reconstruction point's coordinates (376b). This is added to ZR=RPT by an adder (378) to provide the round trip travel distance (379c).

In FIG. 4, this modification replaces the ROMs (69, 71) and latches (70, 72) which are normally used to compute the distance PRT (73). Theory of Ellipsoidal Backprojection Some mathematics underlying the theory of ellipsoidal backprojection will be tersely reviewed to show how the ellipsoidal backprojection hardware architecture is related to the theory. This will be useful, to mathematically inclined workers in the art, for designing variations and optimizing hardware architectures.

For active imaging systems in general, given a point transmitter at T excited by $\delta(t)$ the Dirac distribution, a spherical wave is launched of the form $(1/r)\delta(ct-r)$, c being the propagation velocity and r is the distance from T. Denoting distance from A to B by $d(A,B)$, a reflecting point at X intercepting the wave will emit a wave of the form $(1/d(T,X))\delta(ct-d(T,X))*(1/d(X,E))\delta(ct-d(X,E))=(1/(d(T,X)d(T,X)))\delta(ct-d(T,X)-d(X,E))$, where E is an observation point in space. $\delta(ct-d(T,X)-d(X,E))$ is a Dirac distribution with the equation of an ellipsoid as its argument. So the signal received at a point receiver at E due to reflecting object $o(X)$ is the ellipsoidal projection:

$$s(E,T,t)=((16\pi^2 d(T,X)d(X,E))^{-1}\delta(ct-d(T,X)-d(X,E)),o(x)), \qquad (1)$$

where $(.,.)$ is the inner product: $(f,g)=\int f(Y)g(Y)dY$.

Defining the "elementary active imaging Green's function":

$$g_e(X,E,T,t)=(16\pi^2 d(T,X)d(X,E))^{-1}\delta(ct-d(T,X)-d(X,E)), \qquad (2)$$

yields $s(E,T,t)=(g_e(X,E,T,t),o(X)),$ (3)

for the echoes received at E when the object $o(X)$ is illuminated by an impulsive wave from T. These are ellipsoidal projections of the object. The output of a receiver aperture {E} which sums the signals from its points E according to $\Gamma(X,E,t)$, and due to a reflecting point at X, is $$i(X,t)=\int s(E,T,\gamma(X,E,t))dE. \qquad (4)$$

If there are multiple point transmitters fired according to $t(T)$ $$s(E,t)=\int s(E,T,\Gamma(X,E,t(T))dT. \qquad (5)$$

So the receiver aperture output will be for a reflecting point $$i(X,t) = \int s(E,T,\gamma(X,E,t(T))) dEdT,  \quad (6)$$

and for a reflecting object o(X), $$i(X,t) = \int (g_e(X',E,T,\Gamma(X,E,t(T))), o(X')) dEdT \quad (7)$$

Here $g(X',X,t) = \int g_e(X',E,T,\Gamma(X,E,t(T))) dEdT \quad (9)$ is defined as the "active imaging system Green's function". For a general transmitted pulse f(t), rather than δ(t), $$i(X,t) = (g(X',X,\Gamma(X,E,t(T)))*f(t), o(X')). \quad (10)$$

For ellipsoidal backprojection, Γ=(d(T,X)+d(X,E))/c, and disregarding time variation of the image gives $$i(X) = (s(E,T,t), \delta(t - (d(T,X) + d(X,E))/c)) \quad (11)$$

$$= \int s(E,T,t) dEdTdt \text{ (over } t = (d(T,X) + d(X,E))/c)). \quad (12)$$

To arrive at a filter, consider the 3D Radon transform results:

$$\delta(X) = \int \delta''(p - X \cdot W) dWdp, \quad (13)$$

where $\delta''(p - X \cdot W)$ are impulsive planar triple layers, W being the direction cosine vector and p the plane's distance from the origin. Ellipsoidal projections and backprojections can be approximated by their tangent planes at X, and for ideal images, the image of a point at X must be δ(X) so that i(X)=(o(X')*δ(X−X'))=o(X). This means that the impulsive ellipsoidal projections due to δ(t) must be twice differentiated with respect to t before backprojection. So for filtered ellipsoidal backprojection $$i(X) = (s(E,T,t), \delta''(t - (T,X) + d(X,E))/c)), \quad (14)$$

and for a transmitted signal of the form f(t) we get $$\begin{aligned}
i(X) &= (s(E,T,t)*f^{*-1}(t), \delta''(t - (d(T,X) + d(X,E))/c)) \\
&= D_{tt}(s(E,T,t)*f^{*-1}(t), \delta(t - (d(T,X) + d(X,E))/c)) \\
&= (D_{tt}s(E,T,t)*f^{*-1}(t), \delta(t - (d(T,X) + d(X,E))/c)) \\
&= (s(E,T,t)*D_{tt}f^{*-1}(t), \delta(t - (d(T,X) + d(X,E))/c)) \\
&= (s(E,T,t)*f^{*-1}(t), D_{tt}\delta(t - (d(T,X) + d(X,E))/c))
\end{aligned} \quad (15)$$

where $f^{*-1}$ is the convolution inverse of f: $\delta = f*f^{*-1}$; $D_{tt}$ is the second partial derivative with respect to t. A structure related to this last equation is implemented in discrete, approximate form in hardware (as shown in FIGS. 4, 5, 26, 28) to accomplish filtered ellipsoidal backprojection. A discrete form of the equation is:

$$i(X) = \Sigma s(E,T,t)*F(t), \quad (16)$$

where $t = (d(T,X)+d(X,E))/c$; and the summation is over all E and T; and also where $F(t) = \delta''(t)*f^{*-1}(t) \propto f'^{*-1}(t) = D_{tt}f^{*-1}(t)$ is the filter. This last equation is related to the hardware architecture, described in this patent application, which is used for filtered ellipsoidal backprojection. Note that there are many alternate ways of forming equivalents to this last equation. Some are better than others for specific hardware implementations.

While the above descriptions contains many specifics, these should not be construed as limitations on the scope of the invention, but as an example of several embodiments.

Sparse or non sparse two or three dimensional arrays may be used. The receiver array can be any shape, two dimensional or three dimensional, although circular is typically optimal. The transmitter or transmitters can be located at any position with respect to the receiver array. The tomograms may be extracted in a more flexible manner by implementing, in hardware, equations that described the tomographic plane and then by using these equations to extract voxels from the 3D image to be used as tomographic pixels. The viewing perspective through the 3D volume may be made more continuously variable by implementing in hardware the viewing perspective vector and using it to generate 3D memory addresses to access voxels to be summed, thus causing the integration.

Large extended spherically curved transmitters may be intermixed with small point like transmitters.

Synthesis of Multiple Transmitters Via Annular Arrays

The relative peak sidelobe level in ellipsoidal backprojection imaging is a function of the product of the number of transmitters and the number of receivers. Synthesis of multiple transmitters allows sidelobe reduction without adding a large number of elements to the array. Two hundred or more trnamsitters can be synthesized from a single annular array containing only 8 to 16 elements.

Figure 52:
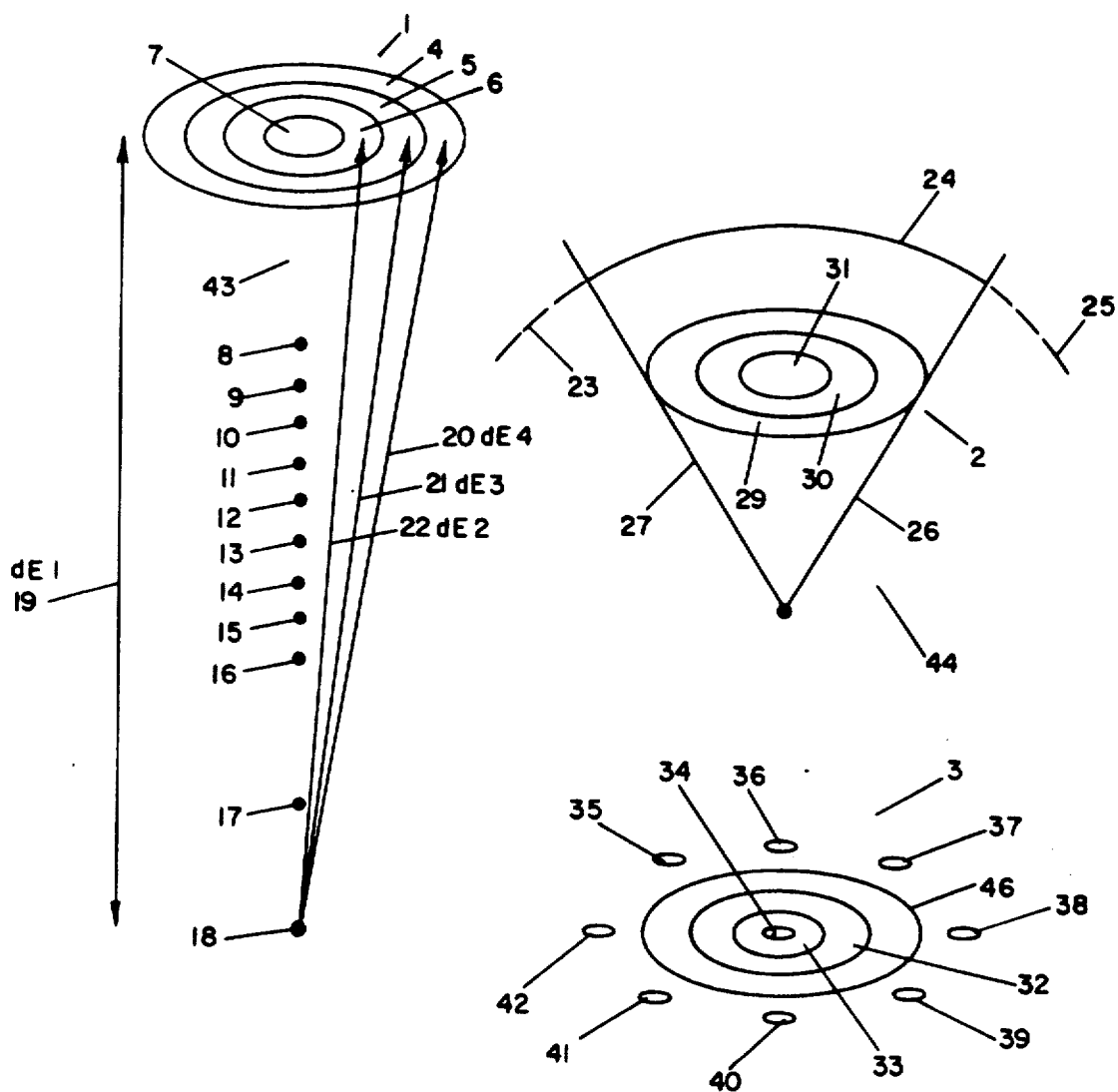
FIG. 52 shows the synthesis of multiple transmitters using an annular array.

FIG. 52 shows the use of an annular array in the synthesis of multiple transmitters. In the following refer to FIG. 52. Annular arrays (1, 2, 46) are most commonly used in focused mode: the outer elements (4, 5, 29, 45, 32) are fired (or pulsed) before the inner elements (6, 7, 30, 31, 33, 34).

However, here, the array (1, 2, or 46) is used in defocused mode (the elements (4, 5, 6, 7, 29, 30, 31, 45, 32, 33, 34) are fired in a sequence from the innermost to the outermost) to generate spherical waves, for example (24), with 'Virtual Centers', (28) or also (8, 9, 10, 11, 12, 13, 14, 15, 16, 17, 18), located at various points along the line through the center of the annular array, which is also perpendicular to the plane of the array (43). For example in (44) the elements are fired in the following order: (29), (30), (31). In the drawing figures in FIG. 52 three annular arrays are shown (1, 2, 46), each having 3 or 4 ring-like elements. This is done to simplify the drawings and facilitate understanding. In a practical system there might be as many as 32 or 64 elements.

Figure 53:
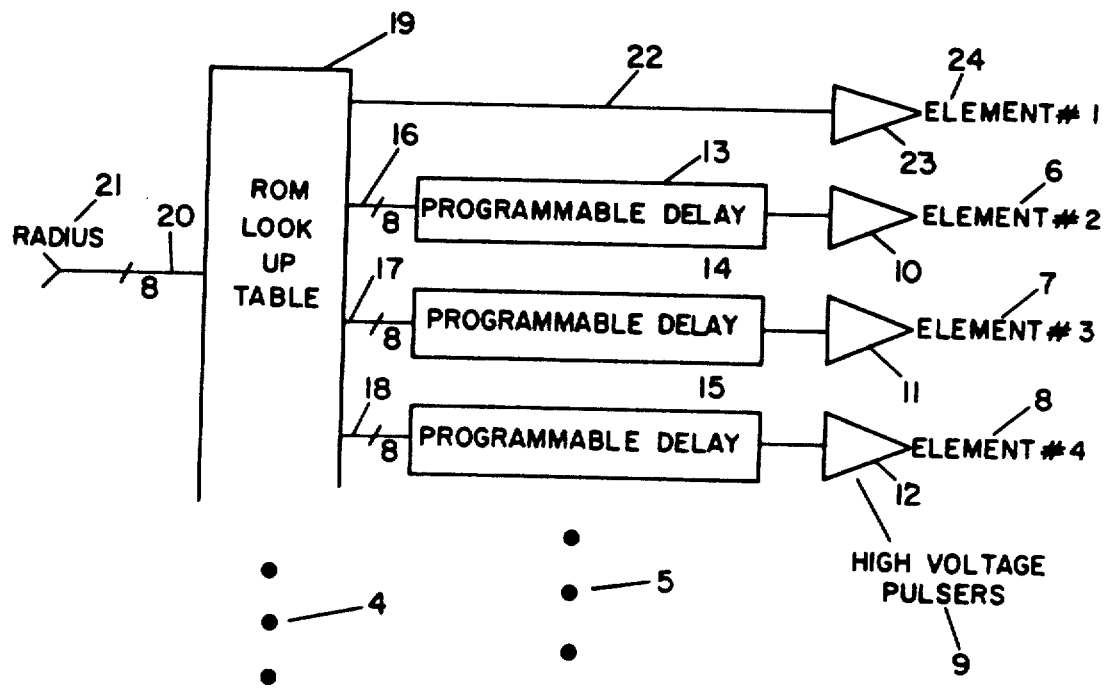
FIG. 53 shows the annular array pulser.

The use of large spherically curved transmitters has been previously described, and has been illustrated in FIGS. 21, 22, 23, 24. The annular array can be used to synthesize large spherically curved transmitters. The resultant echoes can be used for image reconstruction as if they resulted from multiple large spherically curved transmitters, so the previously described image reconstruction circuitry can be used (see FIG. 24). However new circuits must be added to pulse the annular array elements in the appropriate sequence and at the correct times. This is shown in FIG. 53. System timing and control, FIG. 1-23, sends an 8 bit (nonzero) radius word to the annular array pulser (FIG. 53). This initiates the transmission of a spherical wave. The direct wave portion of this wave is equivalent to a spherical wave originating from a point transmitter located at coordinate (0,0,radius), ie. the Virtual Center. That is, the radius word gives the location of the center of cuvature (Virtual Center) along the z axis (refer to FIG. 3 for coordinates and FIG. 22a for the geometry).

Refer to FIG. 52 which shows the annular array pulser. When the radius (21) is input (20) to the annular array pulser, the innermost (or central element) (24) is pulsed immediately (22). The other elements (6,7,8) are pulsed in sequence after time delays determined by the programmable delays (13,14,15). Each delay command (16,17,18) for each programmable delay is obtained from a lookup table stored in ROM (read only memory) (19). The radius word (20) is used as an address for the ROM. The delay commands are computed according to equations (1), (2), (3). In these equations v is the velocity of propagation of the transmitted and reflected waves. Now referring to FIG. 52, dE1 (19), the Virtual Radius, is the distance form the Virtual Center (18) to the array (1). dE2 (22) is the distance form the Virtual Center to element number 2 (6). dE3 (21) is the distance from the Virtual Center to element number 3 (5). dE4 (20) is the distance from the Virtual Center to element number 4 (4). If there were more elements in the array, the additional distances dEi would be defined similarly. Referring again to FIG. 53, delay 2 (3), delay 3 (2), and delay 4 (1) are the delay commands (16,17,18). The pulses are amplified by high voltage pulsers (9). Each pulser (23,10,11,12) drives an element (24,6,7,8) in the annular array. This circuitry can be repeated (4,5) to drive a larger number of array elements.

FIG. 52 (3) shows a typical transmit/receive array geometry using multiple small receiver elements (35,36,37,38,39,40,41,42) and a single large annular array transmitter (46) consisting of 4 transmitter elements (32,33,34,45).

What is claimed is:

1. A medical ultrasound imaging device for imaging objects in a three dimensional volume, comprising:
    a) At least one extended transmitter means comprising a spherically curved extended transmitter which transmits an acoustic pulse which radiates through a wide solid angle;
    b) Receiver means for detecting echoes from reflecting points, caused by said pulse, simultaneously at three or more receiver elements;
    c) Sampling means for sampling said detected echoes form each said receiver element of said receiver elements whereby an echo sample set is created which is associated with the transmitter;
    d) Several of said transmitted means whereby system timing and control repeats a) through c) with different transmitters located at different positions and whereby a different set of echo samples becomes associated with each of the transmitters;
    e) Selecting and combining means for selecting and combining with each other, for each of the reflecting points, one of the echo samples from each of the receiver element's echo sample sets associated with each of the transmitters, whereby images are created of the reflecting points, said selecting and combining points, for echo sample selection: the sum of a) distance from center of curvature of the extended transmitter to the reflecting point minus transmitter's radius of curvature, with b) distance from the reflecting point to the receiver element, said sum then divided by propagation velocity of the echoes.

2. The device of claim 1 wherein the extended transmitter is one single flat large extended transmitter, whereby the radius of curvature of said transmitter is infinite.

3. The device of claim 1 wherein the extended transmitter is one single spherically curved large extended transmitter.

4. The device according to claim 1 wherein the transmitted pulse is a monopolar pulse.

5. A medical ultrasound imaging device for generating an image of reflecting points in a three dimensional volume, said device utilizing an array of receiver elements and one or more large curved extended transmitter element means, said device comprising:
    a) Large extended transmitter element means for transmitting a pulse of acoustic energy which will radiate uniformly through a solid angle in the three dimensional volume;
    b) A Receiver means for simultaneously detecting echoes, caused by said radiated pulses of energy reflecting from said reflecting points;
    c) Sampling means for sampling said detected echoes from each of the receiver elements of said array of receiver elements;
    d) Inverse triplet filter means for inverse triplet filtering said sampled detected echoes;
    e) Reconstruction processor means for combining said inverse triplet filtered sampled detected echoes into image points of the reflecting points within the three dimensional volume, whereby the image is reconstructed, said means utilizing total time of flight associated with each of the echo samples to determine into which of the image points the echo samples should be combined, wherein said time of flight consists of the sum of: 1) the distance from the center of curvature of the transmitter element means to the reflecting point which corresponds to the image point, minus the transmitter's radius of curvature, divided by the velocity of the transmitted pulse, and 2) the distance from the reflecting point which corresponds to the image point back to the receiver element, said sum then divided by the velocity of the echo.

6. The device of claim 5 wherein there is more than one transmitter, and further comprising:

A system Timing and Control means for repeating a), b), c), d), e) whereby the echo samples received at each of the receiver elements due to pulses radiated from each transmitter means are combined into the image.

7. The device of claim 5 wherein the extended transmitter is one single flat large extended transmitter.

8. The device of claim 5 wherein the extended transmitter is one single spherically curved large extended transmitter.

9. The device according to claim 5 wherein said image is two dimensional.

10. The device according to claim 9 wherein the transmitted pulse is a low interference pulse.

11. A medical ultrasound imaging device for generating a image of reflecting points, said device utilizing an array of receiver elements and one or more large extended annular array transmitter means, said device comprising:

a) Large extended annular array transmitter means for transmitting a wave of acoustic energy, with a specified Virtual Radius, which will radiate uniformly through a solid angle in the three dimensional volume, said transmitter means comprising an annular array and an annular array pulser;

b) A means for simultaneously detecting echoes, caused by said radiated wave of energy reflecting from said reflecting points, at three or more of the receiver elements;

c) Sampling means for sampling said detected echoes from each of the receiver elements of said array of receiver elements;

d) Reconstruction processor means for combining said sampled detected echoes into image points of the reflecting points within the three dimensional volume, whereby the image is reconstructed, said means utilizing total time of flight associated with each of the echo samples to determine into which of the image points the echo samples should be combined, wherein said time of flight consists of the sum of: 1) the distance from the center of curvature of the transmitter element means to the reflecting point which corresponds to the image point, minus the Virtual Radius of said radiated wave, divided by the velocity of the radiated wave, and 2) the distance from the reflecting point which corresponds to the image point back to the receiver element, said sum then divided by the velocity of the echoes.

12. The device of claim 11 further comprising a system timing and control which repeats a) through d) while supplying several different specified Virtual Radii to the annular array pulser.

13. The device according to claim 11 wherein said image is two dimensional.

14. The device according to claim 13 further comprising an inverse triplet filter for inverse triplet filtering the sampled detected echoes.

15. A medical ultrasound imaging device for generating an image of reflecting points, said device utilizing an array of receiver elements and one or more large extended annular array transmitter, said device comprising:

a) Large extended annular array transmitter means for transmitting a wave of acoustic energy which will radiate uniformly through a solid angle in the three dimensional volume, said transmitter means comprising an annular array and an annular array pulser;

b) A means for simultaneously detecting echoes, caused by said radiated wave of energy reflecting from said reflecting points, at three or more of the receiver elements;

c) Sampling means for sampling said detected echoes from each of the receiver elements of said array of receiver elements;

d) Inverse triplet filter means for inverse triplet filtering said sampled detected echoes;

e) Reconstruction processor means for combining said inverse triplet filtered samples detected echoes into image points of the reflecting points within the three dimensional volume, whereby the image is reconstructed, said means utilizing total time of flight associated with each of the echo samples to determined into which of the image points the echo samples should be combined, wherein said time of flight consists of the sum of: 1) the distance from the Virtual Center of the transmitter element means to the reflecting point which corresponds to the image point, minus the Virtual Radius, divided by the velocity of the radiated wave, and 2) the distance from the reflecting point which corresponds to the image point back to the receiver element, said sum divided by the velocity of the echoes.

16. The device of claim 15 further comprising a system timing and control which repeats a) through e) while supplying several different specified Virtual Radii to the annular array pulser.

17. The device according to claim 15 wherein said image is two dimensional.

18. The device according to claim 17 wherein the transmitted pulse is a low interference pulse.

* * * * *